United States Patent
Nagai et al.

(10) Patent No.: US 8,095,639 B2
(45) Date of Patent: Jan. 10, 2012

(54) MONITORING-TARGET-APPARATUS MANAGEMENT SYSTEM, MANAGEMENT SERVER, AND MONITORING-TARGET-APPARATUS MANAGEMENT METHOD

(75) Inventors: Takayuki Nagai, Machida (JP); Daisuke Shinohara, Yokohama (JP); Nobuhiro Maki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/929,148

(22) Filed: Jan. 4, 2011

(65) Prior Publication Data
US 2011/0099260 A1 Apr. 28, 2011

Related U.S. Application Data

(63) Continuation of application No. 12/379,522, filed on Feb. 24, 2009, now Pat. No. 7,890,645.

(30) Foreign Application Priority Data

Oct. 28, 2008 (JP) ................................ 2008-276920

(51) Int. Cl.
*G06F 15/173* (2006.01)
(52) U.S. Cl. ......................... 709/223; 709/229; 709/225
(58) Field of Classification Search .......... 709/220–224, 709/229, 225
See application file for complete search history.

(56) References Cited

U.S. PATENT DOCUMENTS

| 7,219,151 | B2 | 5/2007 | Kobayashi et al. |
| 7,353,260 | B1 | 4/2008 | Senum |
| 7,913,075 | B2 * | 3/2011 | Kalman et al. ................... 713/2 |
| 2003/0105830 | A1 | 6/2003 | Pham et al. |
| 2005/0091333 | A1 | 4/2005 | Kobayashi et al. |
| 2006/0075470 | A1 * | 4/2006 | Tanaka et al. ..................... 726/2 |
| 2006/0085522 | A1 * | 4/2006 | Spry ............................. 709/220 |
| 2007/0055838 | A1 * | 3/2007 | Mitsuoka et al. ............. 711/164 |
| 2007/0112974 | A1 * | 5/2007 | Shirogane et al. ............ 709/239 |
| 2008/0098110 | A1 | 4/2008 | Takeda et al. |

FOREIGN PATENT DOCUMENTS

JP 2005-062941 3/2005

OTHER PUBLICATIONS

PCT Written Opinion and International Search Report mailed Mar. 15, 2010, in English.

* cited by examiner

*Primary Examiner* — Abdullahi Salad
(74) *Attorney, Agent, or Firm* — Stites & Harbison PLLC; Juan Carlos A. Marquez, Esq.

(57) ABSTRACT

If both of LUN security information on storage apparatuses and configuration information on an iSNS server are acquirable, a management server makes reference to configuration situation of the LUN security acquired from a monitoring-target storage apparatus, thereby acquiring iSCSI initiator names which are permitted to access the storage apparatus. Moreover, the management server acquires, from the iSNS server, IP address of an iSCSI initiator name which does not exist on a monitoring-target host out of the iSCSI initiator names, then adding the IP address into monitoring-target nodes. Meanwhile, when an access from the management server to a monitoring-target node becomes impossible for a certain constant time-period due to a reason such that the monitoring-target node has been excluded from the network, the management server is capable of excluding the monitoring-target node from the monitoring targets on a GUI.

15 Claims, 22 Drawing Sheets

FIG. 6A

13300A LOGICAL VOLUME MANAGEMENT TABLE (HOST1)

| DRIVE NAME | iSCSI INITIATOR NAME | COUPLING-DESTINATION iSCSI TARGET NAME | LUN ID |
|---|---|---|---|
| E: | com.hitachi.sv1 | com.hitachi.sto1 | 0 |
| F: | com.hitachi.sv1 | com.hitachi.sto1 | 1 |
| G: | com.hitachi.sv1 | com.hitachi.sto11 | 0 |
| H: | com.hitachi.sv1 | com.hitachi.sto11 | 1 |
| ⋮ | ⋮ | ⋮ | ⋮ |

FIG. 6B

13300B LOGICAL VOLUME MANAGEMENT TABLE (HOST2)

| DRIVE NAME | iSCSI INITIATOR NAME | COUPLING-DESTINATION iSCSI TARGET NAME | LUN ID |
|---|---|---|---|
| E: | com.hitachi.sv2 | com.hitachi.sto2 | 0 |
| ⋮ | ⋮ | ⋮ | ⋮ |

FIG. 6C

13300C LOGICAL VOLUME MANAGEMENT TABLE (HOST3)

| DRIVE NAME | iSCSI INITIATOR NAME | COUPLING-DESTINATION iSCSI TARGET NAME | LUN ID |
|---|---|---|---|
| E: | com.hitachi.sv3 | com.hitachi.sto12 | 0 |
| ⋮ | ⋮ | ⋮ | ⋮ |

FIG. 7

23200 VOLUME MANAGEMENT TABLE

| VOLUME ID (23210) | CAPACITY (23220) | TARGET ID (23230) | LUN ID (23240) |
|---|---|---|---|
| VOL1 | 20GB | TG1 | 0 |
| VOL2 | 20GB | TG1 | 1 |
| VOL3 | 20GB | TG2 | 0 |
| ⋮ | ⋮ | ⋮ | ⋮ |

FIG. 8A 23300A iSCSI TARGET MANAGEMENT TABLE (LUN SECURITY IS PRESENT)

| TARGET ID (23310) | iSCSI TARGET NAME (23320) | ACCESSIBLE iSCSI INITIATOR NAME (23330) |
|---|---|---|
| TG1 | com.hitachi.sto1 | com.hitachi.sv1 |
| TG2 | com.hitachi.sto2 | com.hitachi.sv2 |
| ⋮ | ⋮ | ⋮ |

FIG. 8B

23300B TARGET MANAGEMENT TABLE (LUN SECURITY IS ABSENT)

| TARGET ID (23310) | iSCSI TARGET NAME (23320) |
|---|---|
| TG1 | com.hitachi.sto11 |
| TG2 | com.hitachi.sto12 |
| ⋮ | ⋮ |

FIG. 9

32100 APPARATUS LOGIN ID MANAGEMENT TABLE

| APPARATUS TYPE | USER NAME | PASSWORD |
|---|---|---|
| HOST COMPUTER | user | pwd |
| HOST COMPUTER | test | test |
| STORAGE APPARATUS | Admin | admin |
| iSNS SERVER | usr | pass |
| ⋮ | ⋮ | ⋮ |

32200 DISCOVERY TARGET ADDRESS MANAGEMENT TABLE

| DISCOVERY TARGET ADDRESS |
|---|
| 192.168.5.5   −   192.168.5.50 |
| 192.168.6.1   −   192.168.6.10 |
| 192.168.6.101   −   192.168.6.110 |
| ⋮ |

FIG. 11

32300 DISCOVERED APPARATUS MANAGEMENT TABLE

| IP ADDRESS | APPARATUS TYPE | APPARATUS ID | MONITORING TARGET FLAG | USER NAME | PASSWORD |
|---|---|---|---|---|---|
| 32310 | 32320 | 32330 | 32340 | 32350 | 32360 |
| 192.168.5.5 | HOST COMPUTER | HOST1 | Yes | user | pwd |
| 192.168.5.6 | HOST COMPUTER | HOST4 | No | user | pwd |
| 192.168.5.10 | STORAGE APPARATUS | SYS1 | Yes | Admin | admin |
| 192.168.5.11 | STORAGE APPARATUS | SYS2 | Yes | Admin | admin |
| 192.168.5.20 | iSNS SERVER | iSNS1 | Yes | usr | pass |
| ... | ... | ... | ... | ... | ... |

FIG. 12A

32400 DEVICE-COUPLING MANAGEMENT TABLE

| APPARATUS ID 32410 | VOLUME ID 32420 | iSCSI TARGET NAME 32430 | LUN ID 32440 | ACCESSIBLE iSCSI INITIATOR NAME 32450 | COUPLING-DESTINATION HOST ID 32460 | COUPLING-DESTINATION DRIVE NAME 32470 |
|---|---|---|---|---|---|---|
| SYS1 | VOL1 | com.hitachi.sto1 | 0 | com.hitachi.sv1 | HOST1 | E: |
|  | VOL2 | com.hitachi.sto1 | 1 | com.hitachi.sv1 | HOST1 | F: |
|  | VOL3 | com.hitachi.sto2 | 0 | com.hitachi.sv2 | — | — |
| SYS2 | VOL1 | com.hitachi.sto11 | 0 | — | HOST1 | G: |
|  | VOL2 | com.hitachi.sto11 | 1 | — | HOST1 | H: |
|  | VOL3 | com.hitachi.sto12 | 0 | — | — | — |
| ... | ... | ... | ... | ... | ... | ... |

FIG. 12B

32400 DEVICE-COUPLING MANAGEMENT TABLE
(AFTER ADDITION OF UNDISCOVERED HOST INTO MONITORING TARGETS)

| 32410 APPARATUS ID | 32420 VOLUME ID | 32430 iSCSI TARGET NAME | 32440 LUN ID | 32450 ACCESSIBLE iSCSI INITIATOR NAME | 32460 COUPLING-DESTINATION HOST ID | 32470 COUPLING-DESTINATION DRIVE NAME |
|---|---|---|---|---|---|---|
| SYS1 | VOL1 | com.hitachi.sto1 | 0 | com.hitachi.sv1 | HOST1 | E: |
|  | VOL2 | com.hitachi.sto1 | 1 | com.hitachi.sv1 | HOST1 | F: |
|  | VOL3 | com.hitachi.sto2 | 0 | com.hitachi.sv2 | HOST2 | E: |
| SYS2 | VOL1 | com.hitachi.sto11 | 0 | — | HOST1 | G: |
|  | VOL2 | com.hitachi.sto11 | 1 | — | HOST1 | H: |
|  | VOL3 | com.hitachi.sto12 | 0 | — | HOST3 | E: |
| ... | ... | ... | ... | ... | ... | ... |

FIG. 13

38200 iSCSI NAME MANAGEMENT TABLE (ISNSI)

| IP ADDRESS 38210 | iSCSI NAME 38220 | iSCSI NAME TYPE 38230 |
|---|---|---|
| 192.168.5.3 | com.hitachi.sv3 | INITIATOR |
| 192.168.5.4 | com.hitachi.sv2 | INITIATOR |
| 192.168.5.5 | com.hitachi.sv1 | INITIATOR |
| 192.168.5.6 | com.hitachi.sv4 | INITIATOR |
| 192.168.5.7 | com.hitachi.sto1 | TARGET |
| ⋮ | ⋮ | ⋮ |

FIG. 14

71000 CHANGING MONITORED APPARATUS SCREEN

APPARATUS CHANGING MONITORED SCREEN

LIST OF DISCOVERED APPARATUSES          71010

| | IP ADDRESS | APPARATUS TYPE |
|---|---|---|
| ☑ | 192.168.5.6 | HOST COMPUTER |
| | ⋮ | ⋮ |

71020 — ADD TO MONITORING TARGETS

LIST OF MONITORING APPARATUSES          71030

| | IP ADDRESS | APPARATUS TYPE | APPARATUS ID |
|---|---|---|---|
| ☑ | 192.168.5.5 | HOST COMPUTER | HOST1 |
| ☐ | 192.168.5.10 | STORAGE APPARATUS | SYS1 |
| ☐ | 192.168.5.11 | STORAGE APPARATUS | SYS2 |
| ☐ | 192.168.5.20 | iSNS SERVER | ISNS1 |
| | ⋮ | ⋮ | ⋮ |

71040 — EXCLUDE FROM MONITORING TARGETS

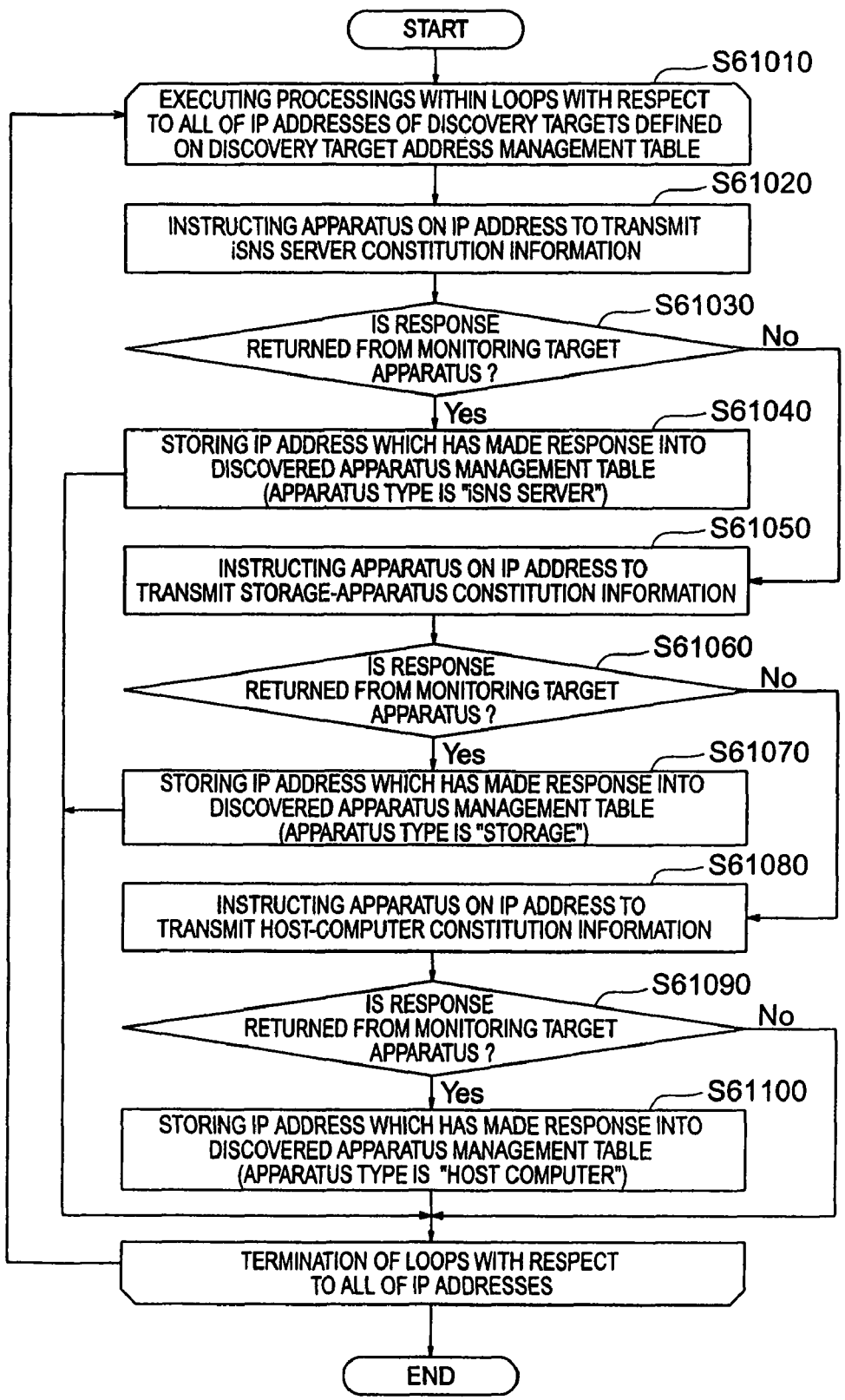

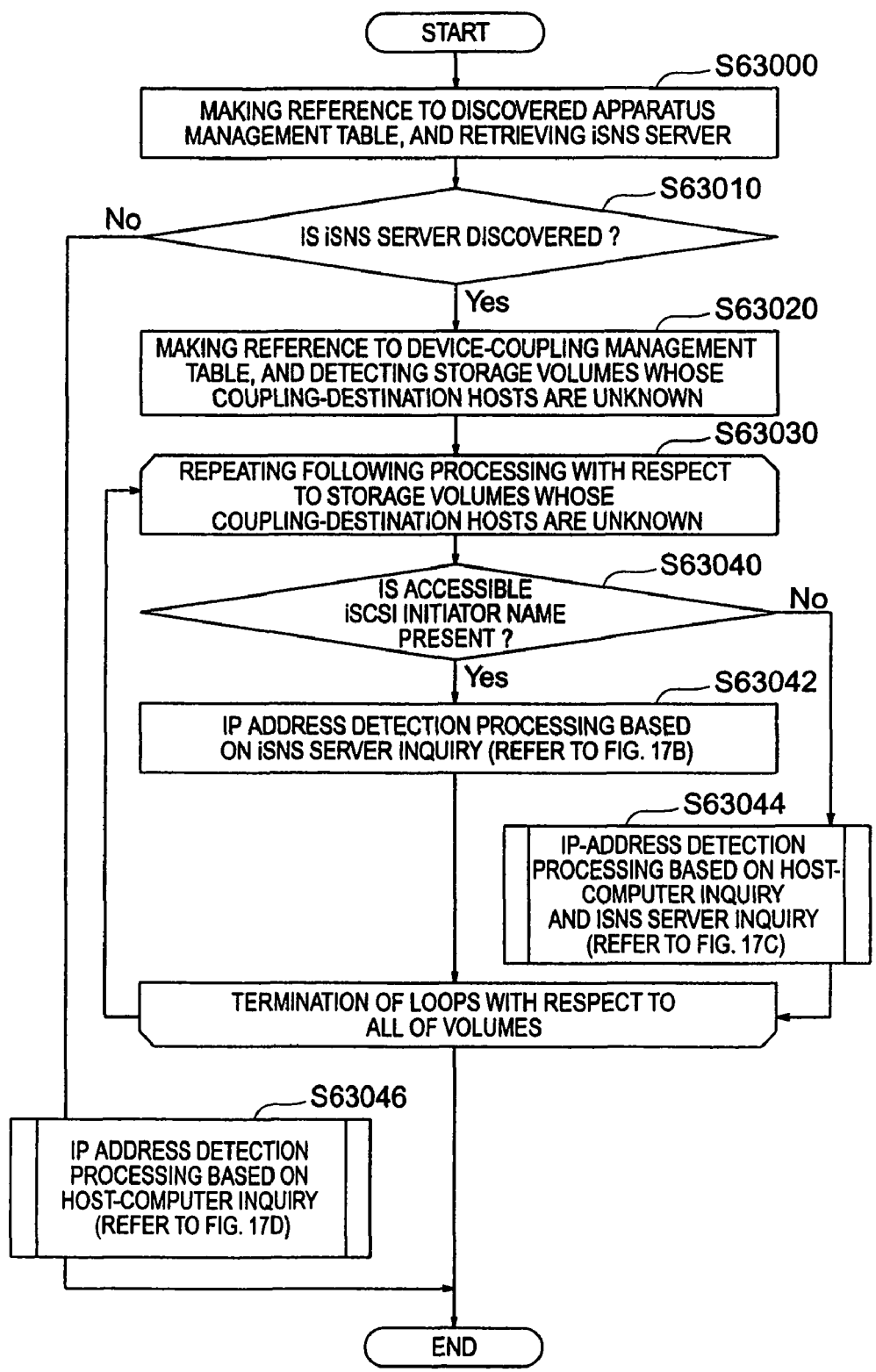

FIG. 18

32300 DISCOVERED APPARATUS MANAGEMENT TABLE

| IP ADDRESS 32310 | APPARATUS TYPE 32320 | APPARATUS ID 32330 | MONITORING TARGET FLAG 32340 | USER NAME 32350 | PASSWORD 32360 | LAST DISCOVERED DATE 32370 |
|---|---|---|---|---|---|---|
| 192.168.5.5 | HOST COMPUTER | HOST1 | Yes | user | pwd | 2008/4/1 10:00 |
| 192.168.5.6 | HOST COMPUTER | HOST4 | No | user | pwd | 2008/4/8 10:00 |
| 192.168.5.10 | STORAGE APPARATUS | SYS1 | Yes | Admin | admin | 2008/4/8 10:00 |
| 192.168.5.11 | STORAGE APPARATUS | SYS2 | Yes | Admin | admin | 2008/4/8 10:00 |
| 192.168.5.20 | iSNS SERVER | iSNS1 | Yes | usr | pass | 2008/4/8 10:00 |
| ... | ... | ... | ... | ... | ... | ... |

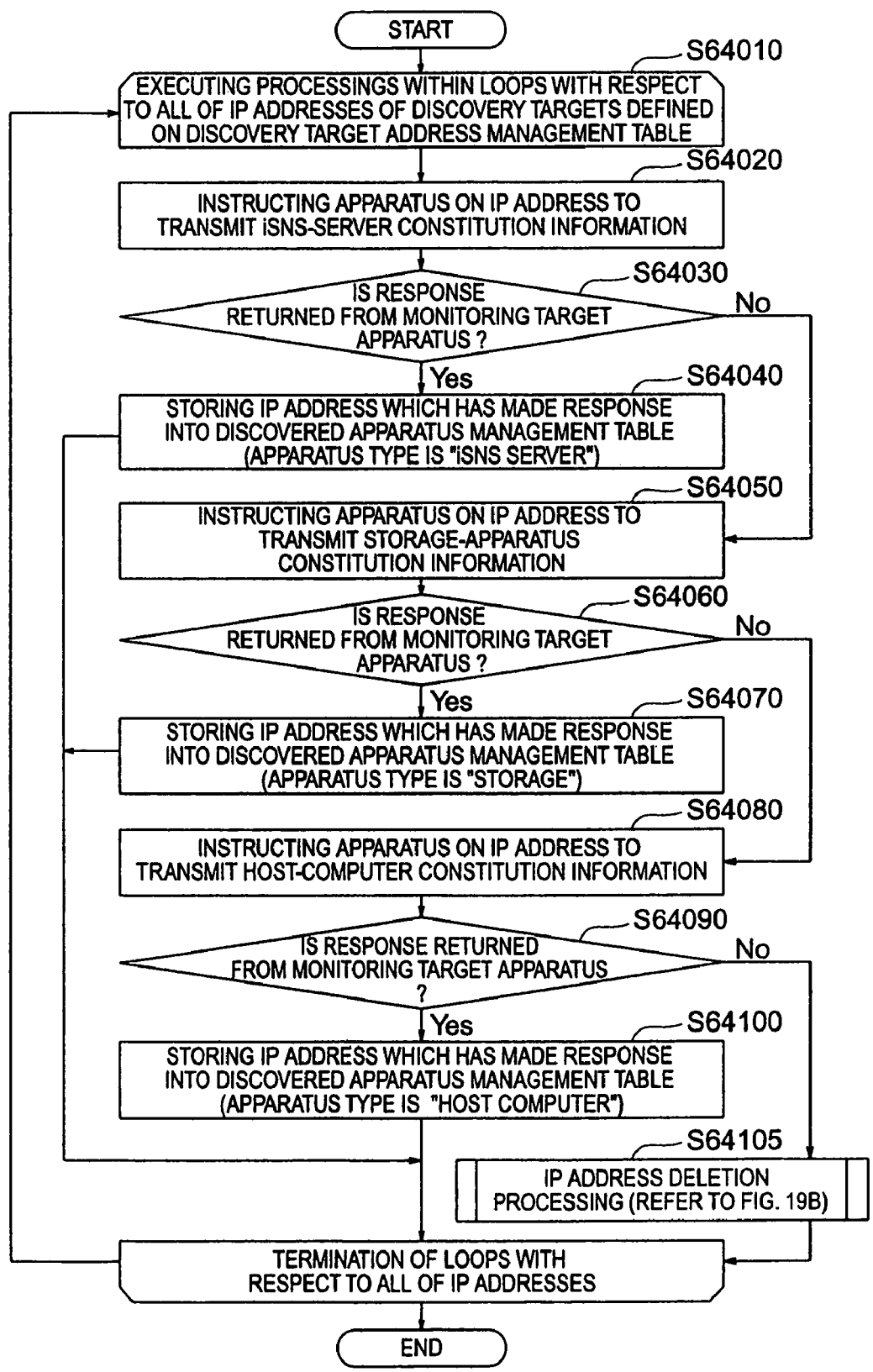

MONITORING-TARGET-APPARATUS MANAGEMENT SYSTEM, MANAGEMENT SERVER, AND MONITORING-TARGET-APPARATUS MANAGEMENT METHOD

INCORPORATION BY REFERENCE

This application is a Continuation of U.S. patent application Ser. No. 12/379,522 filed Feb. 24, 2009, now U.S. Pat. No. 7,890,645. The present application claims priority from U.S. patent application Ser. No. 12/379,522 filed Feb. 24, 2009, which claims priority from Japanese Application No. JP 2008-276920 filed on Oct. 28, 2008, the content of which is hereby incorporated by reference.

BACKGROUND OF THE INVENTION

1. Field of the Invention

The present invention relates to a monitoring-target-apparatus management system, management server, and monitoring-target-apparatus management method for making it possible to detect an apparatus coupled to a network, and to monitor the detected apparatus as the apparatus of a monitoring target.

2. Description of the Related Art

The following technology has been disclosed (refer to, e.g., JP-A-2005-62941): In management software for managing an information processing system constituted by a plurality of host computers and storage apparatuses, constitution information on the storage apparatuses and constitution information on the plurality of host computers which utilize the storage apparatuses are read out in advance, then being stored into an internal memory device of the management software. Moreover, a host-computer group which is utilizing the resource inside a certain specific storage apparatus is detected based on the read-out information. Finally, a report on I/O competition which is focused on only the performance data on the host-computer group is created, then being submitted to the system manager.

In JP-A-2005-62941, the explanation has been given concerning the SAN (: Storage Area Network) system where the plurality of host computers make the shared-use of a storage apparatus. Meanwhile, there is a case where the SAN environment is constructed using an IP (: Internet Protocol) network. Namely, the storage apparatus is coupled onto an IP network such as LAN (: Local Area Network), thereby permitting the plurality of host computers to make the shared-use of the storage apparatus.

In the case of constructing the SAN environment by using an IP network, data communications is performed among the host computers and the storage apparatus using an iSCSI (: Internet Small Computer System Interface), and thus the iSNS (: Internet Storage Name Service) is often utilized. The iSNS allows information on a communications-capable apparatus to be managed in a concentrated manner by using the iSCSI protocol. The iSNS allows implementation of such functions as name solution for iSCSI initiators and target nodes, and access limitation by grouping of the iSCSI initiators and target nodes based on a discovery domain.

Meanwhile, the storage apparatus possesses the LUN (: Logical Unit Number) security function. This function allows the iSCSI initiator name on an access-permitted host computer to be specified on each port basis or each logical volume basis. The information on the iSCSI initiator name on an access-permitted host computer on each port basis or each logical volume basis of the storage apparatus will be referred to as "LUN security information".

In the above-described environment, the management software acquires the constitution information on the plurality of host computers and storage apparatuses. Concretely, the management software acquires the following information periodically, then storing these pieces of information into its internal database: Information on internal constitutions of components inside each storage apparatus, such as port, controller, cache, volume, and RAID (: Redundant Arrays of Independent Disks) group, and information such as coupling-destination storage port of the logical volume on each host computer.

When the management software defines a host computer and a storage apparatus which become the targets whose constitution information are to be acquired, the manager specifies, on the management software, an address range of an appliance which the manager wishes to be dealt with as the monitoring target. The management software periodically tries to perform an information acquisition operation for the address range specified. Then, if there exists a response to the information acquisition operation, the management software adds the appliance in the address range into the information acquisition targets.

At this time, it is conceivable that there exists an address at which no appliance is present, or there exists an address which is utilized by an IT appliance that does not become the monitoring target by the management software. In this case, the management software carries out the information acquisition request for this address. Then, at a point-in-time at which the request is found to fail or to be on time-out, the management software judges this address as being invalid. Eventually, it turns out that the management software has tried the information acquisition request for the invalid address. Accordingly, there has existed a problem that a tremendous time is necessitated for the detection processing of the monitoring target apparatuses. Also, there has existed a problem that, although an appliance which leaks out of the address range specified by the manager should essentially be dealt with as a monitoring target, the management software finds it impossible to detect this appliance.

SUMMARY OF THE INVENTION

The present invention is an invention for solving the above-described problems. Accordingly, an object of the present invention is to provide a monitoring-target-apparatus management system, management server, and monitoring-target-apparatus management method for making it possible to detect an apparatus coupled to a network, and to monitor the detected apparatus as the apparatus of a monitoring target.

In order to solve the above-described problems, the monitoring-target-apparatus management system in the present invention is implemented as follows: A monitoring-target-apparatus management system for detecting an apparatus coupled to a network, and monitoring the detected apparatus as the apparatus of a monitoring target, the monitoring-target-apparatus management system being implemented in an information processing system where storage apparatuses (e.g., storage apparatuses 20000), host apparatuses (e.g., host computers 10000), and a management server (e.g., management server 30000) are coupled to each other via the network, the storage apparatuses which have volumes that are memory areas, the host computers which use the volumes of the storage apparatuses via iSCSI (: Internet Small Computer System Interface) protocol, the management server for managing the storage apparatuses and the host apparatuses.

The management server includes an apparatus discovery program (e.g., apparatus discovery program 33300) for making reference to discovery target address management information (e.g., discovery target address management table 32200) memorized in a memory unit (e.g., memory 33000) and describing IP addresses of discovery targets, issuing a transmission instruction for constitution information on the apparatuses with respect to the IP addresses of the discovery targets, and, if a response is given to the transmission instruction, memorizing, as the apparatus of the monitoring target, the IP address of an apparatus which has returned the response into discovered apparatus management information (e.g., discovered apparatus management table 32300) of the memory unit, an information acquisition program (e.g., information acquisition program 33200) for acquiring constitution information on the apparatus of the monitoring target, and memorizing the constitution information into device-coupling management information (e.g., device-coupling management table 32400) of the memory unit in such a manner that iSCSI target names coupled to the volumes, iSCSI initiator names permitted to access the volumes, and coupling-destination host IDs corresponding to the iSCSI target names are made related with each other, and a monitoring-target program (e.g., management program 33100) for making reference to the device-coupling management information if an iSNS (: Internet Storage Name Service) server has been registered into the discovered apparatus management information, and detecting a volume for which the coupling-destination host corresponding to the iSCSI target name is unknown, acquiring an access-permitted iSCSI initiator name corresponding to the volume for which the coupling-destination host is unknown, requesting the registered iSNS server to acquire the IP address corresponding thereto, and memorizing the acquired IP address into the discovery target address management information and the discovered apparatus management information.

According to the present invention, it becomes possible to detect an apparatus coupled to a network, and to monitor the detected apparatus as the apparatus of a monitoring target.

BRIEF DESCRIPTION OF THE DRAWINGS

FIG. 6A is a diagram for illustrating a constitution example of a logical volume management table included in the host computer;

FIG. 6B is a diagram for illustrating a constitution example of the logical volume management table included in the host computer;

FIG. 6C is a diagram for illustrating a constitution example of the logical volume management table included in the host computer;

FIG. 7 is a diagram for illustrating a constitution example of a volume management table included in the storage apparatus;

FIG. 8A is a diagram for illustrating a constitution example of an iSCSI target management table included in the storage apparatus;

FIG. 8B is a diagram for illustrating a constitution example of the iSCSI target management table included in the storage apparatus;

FIG. 9 is a diagram for illustrating a constitution example of an apparatus login ID management table included in the management server;

FIG. 10 is a diagram for illustrating a constitution example of a discovery target address management table included in the management server;

FIG. 11 is a diagram for illustrating a constitution example of a discovered apparatus management table included in the management server;

FIG. 12A is a diagram for illustrating a constitution example of a device-coupling management table included in the management server;

FIG. 12B is a diagram for illustrating a constitution example of the device-coupling management table included in the management server;

FIG. 13 is a diagram for illustrating a constitution example of an iSCSI name management table included in the iSNS server;

FIG. 14 is a diagram for illustrating an example of an monitored apparatus addition screen displayed by the management server;

FIG. 15 is a flowchart for illustrating an apparatus discovery processing carried out by the management server in the first embodiment;

FIG. 17A is a flowchart for illustrating an undiscovered-host addition processing into the monitoring targets, which is carried out by the management server in the first embodiment;

FIG. 18 is a diagram for illustrating a constitution example of the discovered apparatus management table included in the management server in the second embodiment;

FIG. 19A is a flowchart for illustrating the apparatus discovery processing carried out by the management server in the second embodiment;

DESCRIPTION OF THE INVENTION

Figure 1:
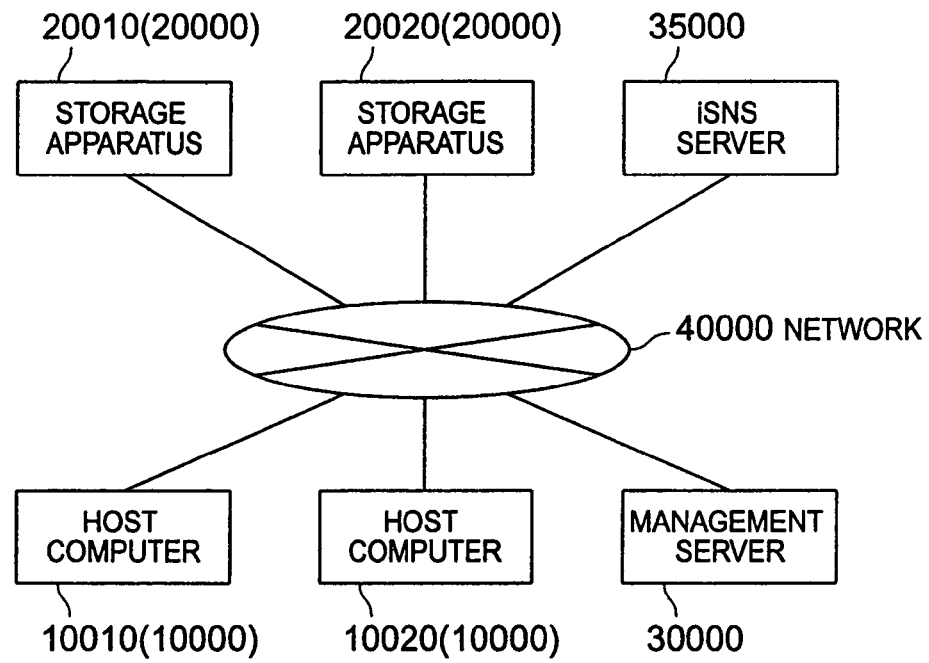
FIG. 1 is a diagram for illustrating a physical constitution example of the information processing system.

Hereinafter, referring to the drawings, the explanation will be given below concerning the embodiments of the present invention.

Embodiment 1

Figure 16:
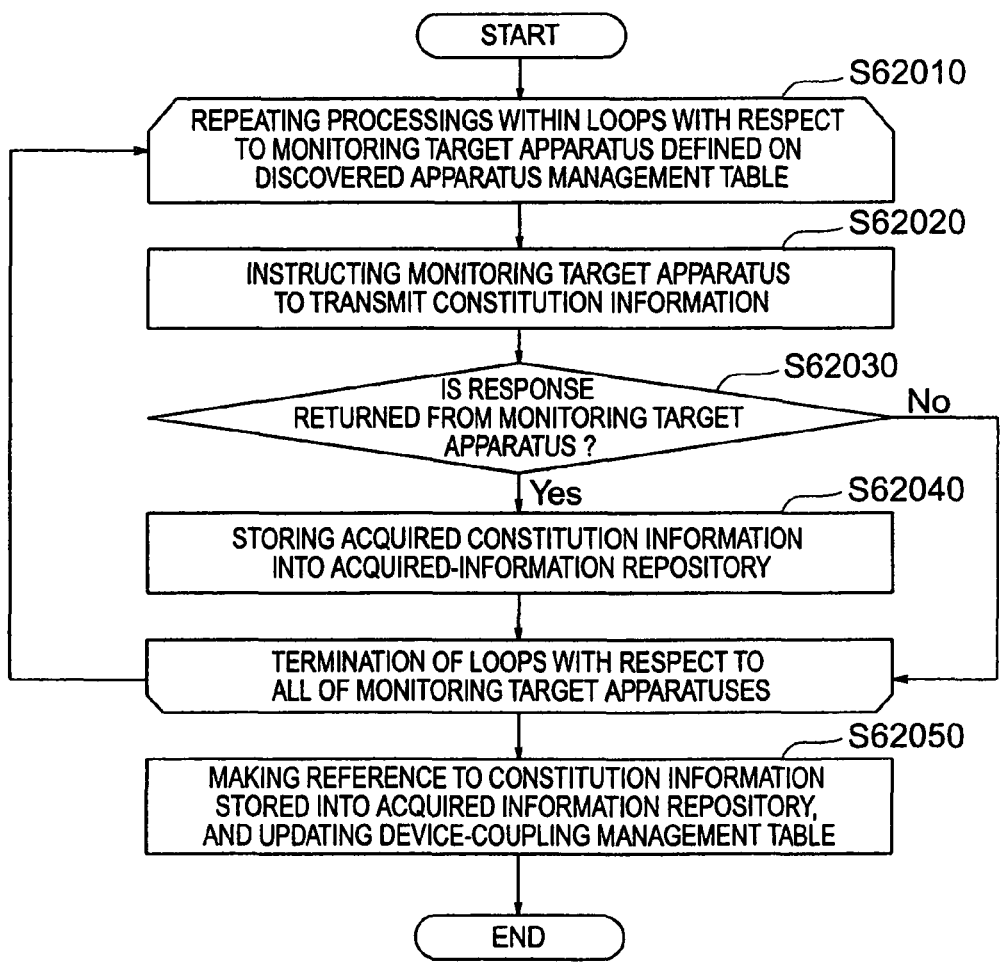
FIG. 16 is a flowchart for illustrating a constitution-information acquisition processing carried out by the management server in the first embodiment.

In the first embodiment, the explanation will be given below concerning a method for allowing the management software to add, into monitoring targets, a host computer which will make an access to a monitoring-target storage apparatus. FIG. 1 to FIG. 4 illustrate the constitution of the information processing system, and constitutions of the apparatuses coupled to the information processing system. FIG. 5 to FIG. 13 illustrate the management information included in each apparatus. FIG. 14 illustrates a screen example of the management server. FIG. 15 to FIG. 17 illustrate the main processing flows.

(1) System Constitution in the First Embodiment

FIG. 1 is a diagram for illustrating a constitution example of the information processing system. Storage apparatuses 20010 (20000) and 20020 (20000), host computers 10010 (10000) and 10020 (10000), a management server 30000, and an iSNS server 35000 are coupled to each other via a network 4000. Incidentally, in FIG. 1, the storage apparatuses 20000 mean that the plurality of storage apparatuses exist. The host computers 10000 (host apparatuses) also mean that the plurality of host computers exist.

Figure 2:
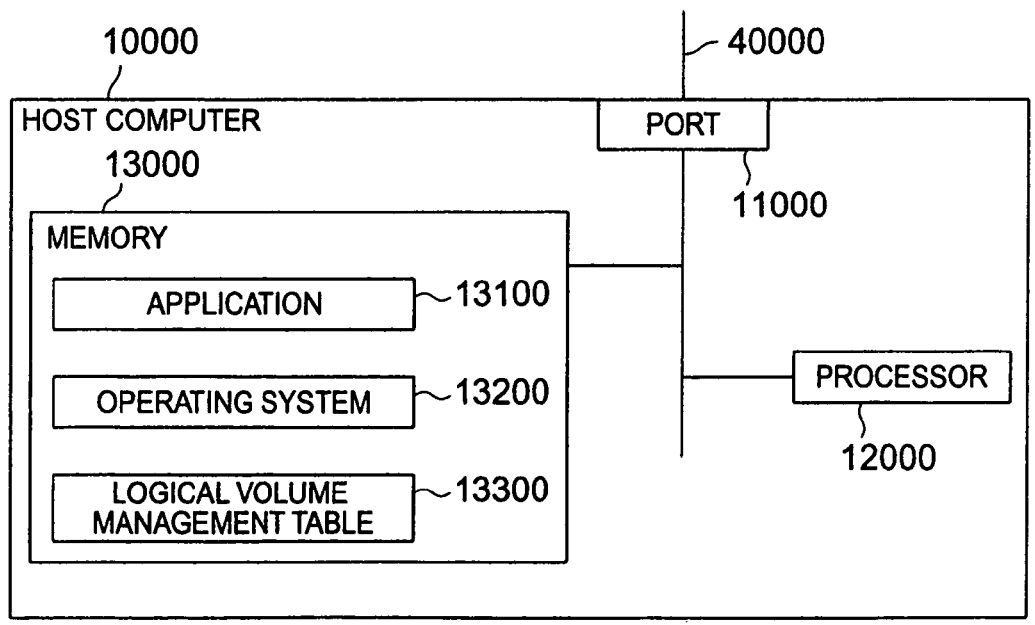
FIG. 2 is a diagram for illustrating a detailed constitution example of the host computer.

FIG. 2 is a diagram for illustrating a detailed constitution example of each host computer 10000. Each host computer 10000 (host apparatus) includes a port 11000 for implementing the coupling to the network 4000, a processor 12000, and a memory 13000. These constitution devices are coupled to each other via a circuit such as internal bus. The memory 13000 stores therein a task application 13100 (application), an operating system 13200, and a logical volume management table 13300 (refer to FIG. 6A, FIG. 6B, and FIG. 6C).

The task application 13100 uses a memory area provided from the operating system, then performing data input/output (which, hereinafter, will be represented as "I/O") into/from the memory area. The operating system 13200 causes the application to recognize the logical volume on a storage apparatus which is coupled to the host computer via a storage network. Incidentally, the port 11000 may also be divided into an I/O port for performing communications with the storage apparatuses 20000 via the iSCSI, and a management port for allowing the management server 30000 to acquire management information included within the host computer.

Figure 3:
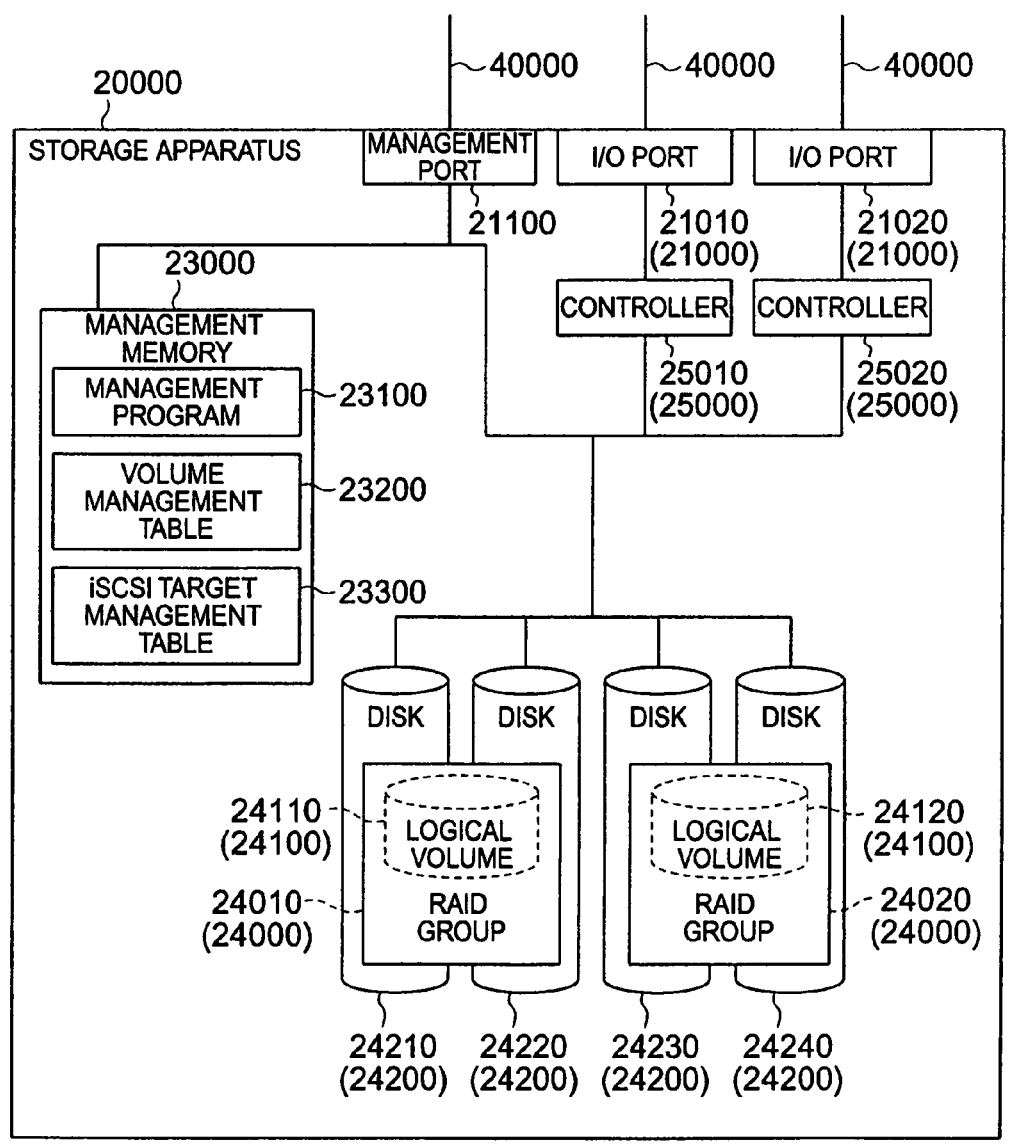
FIG. 3 is a diagram for illustrating a detailed constitution example of the storage apparatus.

FIG. 3 is a diagram for illustrating a detailed constitution example of each storage apparatus 20000. Each storage apparatus 20000 includes I/O ports 21010 (21000) and 21020 (21000) for implementing the coupling to the host computers 10000 via the network 4000, a management port 21100 for implementing the coupling to the network 4000, a management memory 23000 for storing each type of management information, RAID groups 24000 for storing data, controllers 25010 (25000) and 25020 (25000) for controlling the data and the management information within the management memory. These constitution devices are coupled to each other via a circuit such as internal bus.

The management memory 23000 stores therein a management program 23100 for managing the storage apparatus, a volume management table 23200 (refer to FIG. 7), and an iSCSI target management table 23300 (refer to FIG. 8A and FIG. 8B). Each of the RAID groups 24010 (24000) and 24020 (24000) is constituted by a single magnetic disk or a plurality of magnetic disks selected from among magnetic disks 24210 (24200), 24220 (24200), 24230 (24200), and 24240 (24200). When each RAID group is constituted by a plurality of magnetic disks, these magnetic disks are allowed to form the RAID constitution. Also, the RAID groups are logically divided into a plurality of volumes 24110 (24100) and 24120 (24100).

Incidentally, the logical volumes 24100 is not necessarily requited to form the RAID constitution, as long as the logical volumes can be constituted using memory areas of one or more magnetic disks. Moreover, another memory medium such as flash memory may also be used in substitution for the magnetic disks, as long as it can provide memory areas corresponding to the logical volumes.

Each controller 25000 includes therein a processor for exerting the control within each storage apparatus, and a cache memory for temporarily memorizing data exchanged between each storage apparatus and each host computer 10000. Each controller 25000, which intervenes between the I/O ports and the RAID groups, performs transmission/reception of data therebetween.

Incidentally, the constitution of each storage apparatus may be different from the constitution in FIG. 3 and in the above-described explanation. This is established as long as the different constitution can provide the logical volumes to each host computer, and includes a controller for receiving an access request and performing read/write into a memory area, and a device for providing the memory area. For example, the controller and the device for providing the memory area may be stored into another cabinet.

Figure 4:
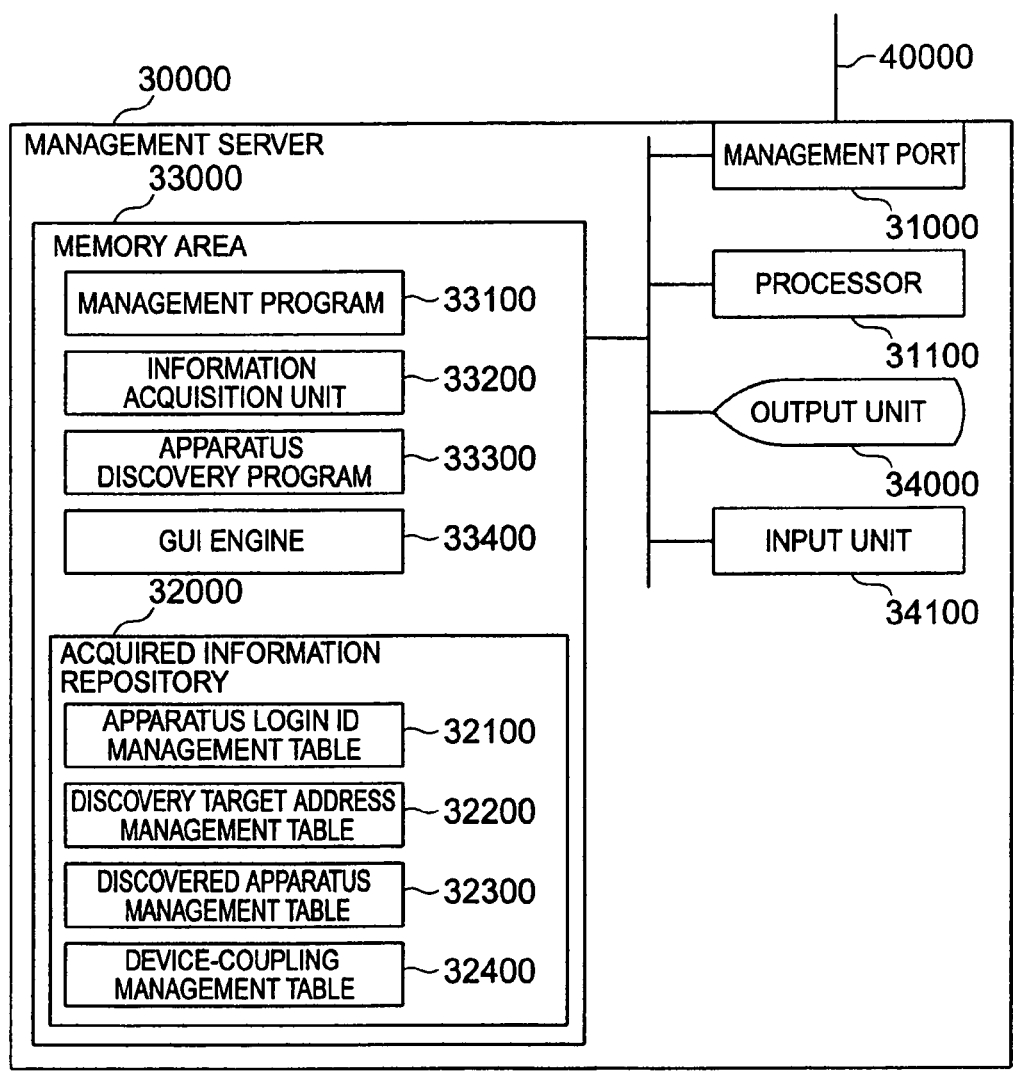
FIG. 4 is a diagram for illustrating a detailed constitution example of the management server.

FIG. 4 is a diagram for illustrating a detailed constitution example of the management server 30000. The management server 30000 includes a management port 31000 for implementing the coupling to the network 4000, a processor 31100, a memory area 33000 (memory unit), an output unit 34000 (which will be described later) such as display apparatus for outputting a processing result, and an input unit 34100 such as keyboard for allowing the storage manager to input an instruction. These constitution devices are coupled to each other via a circuit such as internal bus.

The memory area 33000 (memory unit) stores therein a management program 33100 (monitoring-target program, refer to FIG. 17A to FIG. 17D), an information acquisition program 33200 (refer to FIG. 16), an apparatus discovery program 33300 (refer to FIG. 15), a GUI (: Graphical User Interface) engine 33400, and an acquired information repository 32000. Incidentally, the memory area 33000 is constituted by either of a semiconductor memory and a magnetic disk, or both of the semiconductor memory and the magnetic disk. Additionally, the repository means storehouse of data in information engineering, and thus can also be said to be a database.

The management program 33100 (monitoring-target program) instructs the information acquisition program 33200 to periodically acquire the constitution information from the storage apparatuses 20000 and the host computers 10000 within the information processing system. Also, the management program 33100 periodically instructs the apparatus discovery program 33300 to detect a storage apparatus 20000 and a host computer 10000 which are newly added to the information processing system.

The information acquisition program 33200 acquires the constitution information from the storage apparatuses 20000 and the host computers 10000, then storing the acquired constitution information into the acquired information repository 32000. The apparatus discovery program 33300 detects the storage apparatuses 20000 and the host computers 10000 coupled to the network 4000. Then, if the apparatus discovery program 33300 discovers an apparatus which is newly coupled to the network 4000, the unit 33300 instructs the information acquisition program 33200 to acquire the constitution information from the newly-coupled apparatus.

The acquired information repository 32000 stores therein an apparatus login ID list 32100 (refer to FIG. 9), a discovery target address management table 32200 (discovery target management information, refer to FIG. 10), a discovered apparatus management table 32300 (refer to FIG. 11), and a device-coupling management table 32400 (refer to FIG. 12A and FIG. 12B).

The GUI-display processing unit 33400 displays the acquired constitution information via the output unit 34000 in response to the request from the manager via the input unit 34100. Incidentally, the management server 30000 may periodically acquire not only the constitution information from the storage apparatuses 20000 and the host computers 10000, but also such information as operation situation and performance of the internal constitution components which constitute the storage apparatuses 20000 and the host computers 10000.

Figure 5:
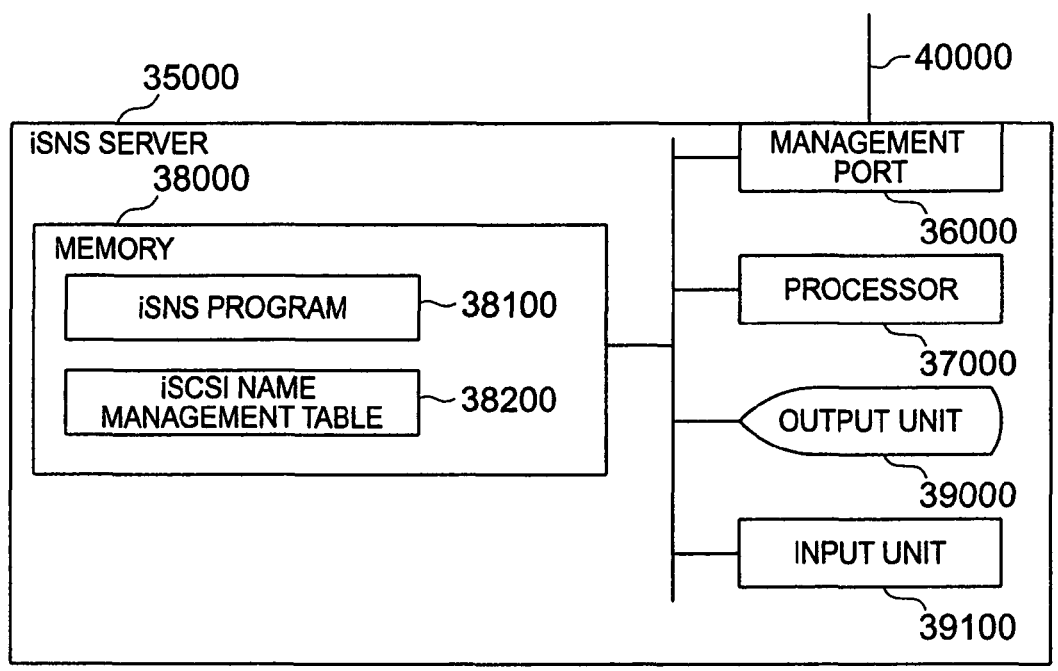
FIG. 5 is a diagram for illustrating a detailed constitution example of the iSNS server.

FIG. 5 is a diagram for illustrating a detailed constitution example of the iSNS server 35000. The iSNS server 35000 includes a management port 36000 for implementing the coupling to the network 4000, a processor 37000, a memory 38000, an output unit 39000 (which will be described later) such as display apparatus for outputting a processing result, and an input unit 39100 such as keyboard for allowing the storage manager to input an instruction. These constitution devices are coupled to each other via a circuit such as internal bus.

The memory 38000 stores therein an iSNS program 38100, and an iSCSI name management table 38200 (refer to FIG. 13). The iSNS program 38100 stores, into the iSCSI name management table 38200, the information on the IP-SAN appliances on the network 4000. Then, in accordance with a request from an IP-SAN appliance, the program 38100 answers the IP address corresponding to the iSCSI name stored in the iSCSI name management table. Incidentally, in substitution for the semiconductor memory, part of the whole of the memory 38000 may be constituted by another memory medium such as the magnetic disk.

FIG. 6A, FIG. 6B, and FIG. 6C are diagrams for illustrating constitution examples of the logical volume management tables included in the host computers 10000. Each of the logical volume management tables 13300A (13300), 13300B (13300), and 13300C (13300) included in the host computers 10000 is constituted from the following fields: A field 13310 for registering a logical volume ID which becomes an identifier for each logical volume within each host computer, a field 13320 for registering an iSCSI initiator name which becomes an identifier for the port 11000 (I/O port) on each host computer, and which is used at the time of communications with each storage apparatus where the actual entity of the logical volume exists, a field 13330 for registering a coupling-destination iSCSI target name which becomes an identifier for the I/O port 21000 on each storage apparatus, and which is used at the time of communications with each storage apparatus where the actual entity of the logical volume exists, and a field 13340 for registering a LUN ID which becomes an identifier for the logical volume in each storage apparatus.

FIG. 6A illustrates an example of concrete values of the logical volume management table 13300A included in the host computer (HOST1). Namely, the logical volume (E:) on the host computer 10000 is coupled to the storage apparatus via the port on the host computer indicated by the iSCSI initiator name of com.hitachi.sv1, and the port on the storage apparatus indicated by the iSCSI target name of com.hitachi.sto1. Moreover, the logical volume (E:) possesses the LUN ID of "0". FIG. 6B and FIG. 6C illustrate examples of basically the same concrete values.

FIG. 7 is a diagram for illustrating a constitution example of the volume management table 23200 included in each storage apparatus 20000. The volume management table 23200 included in each storage apparatus 20000 is constituted from the following fields: A field 23210 for registering a volume ID which becomes an identifier for each volume within each storage apparatus, a field 23220 for registering the capacity of each volume, a field 23230 for registering a target ID which becomes an identifier for an iSCSI target to which each volume belongs, and a field 23240 for registering the LUN ID which becomes an identifier for each volume within the iSCSI target.

FIG. 7 illustrates an example of concrete values of the volume management table 23200 included in each storage apparatus 20000. Namely, the volume VOL1 on the storage apparatus 20000 possesses a 20-GB memory area, belongs to an iSCSI target indicated by the iSCSI target ID of TG1, and possesses the LUN ID of "0".

FIG. 8A and FIG. 8B are diagrams for illustrating constitution examples of the iSCSI target management tables 23300 included in each storage apparatus. Each of the iSCSI target management tables 23300A (23300) and 23300B (23300) is constituted from the following fields: A field 23310 for registering the target ID which becomes the identifier for the iSCSI target within each storage apparatus, a field 23320 for registering the iSCSI target name possessed by each iSCSI target, and a field 23330 for registering the iSCSI initiator name which becomes the identifier for the port on a host computer which is permitted to make an access (coupling) to the volume belonging to each iSCSI target. Incidentally, if each storage apparatus 20000 possesses no LUN security function, the field 23330 is absent as is illustrated in FIG. 8B.

FIG. 8A illustrates an example of concrete values of the iSCSI target management table 23300 included in each storage apparatus 20000. Namely, the iSCSI target TG1 on the storage apparatus 20000 possesses the iSCSI target name of com.hitachi.sto1, and gives the permission to the access from the port on the host computer whose iSCSI initiator name is com.hitachi.sv1.

FIG. 9 is a diagram for illustrating a constitution example of the apparatus login ID management table 32100 included in the management server 30000. The apparatus login ID management table 32100 included in the management server 30000 is constituted from the following fields: A field 32110 for registering type of a discovery target appliance, a field 32120 for registering user name which the apparatus discovery program 33300 uses when it accesses the discovery target appliance, and a field 32130 for registering password which the apparatus discovery program 33300 uses with the user name.

FIG. 9 illustrates an example of concrete values of the apparatus login ID management table 32100 included in the management server 30000. Namely, when the apparatus discovery program 33300 included in the management server 30000 accesses the host computer to confirm whether or not a new appliance has been added, the user name and password which it uses at that time are "user" and "pwd", respectively.

FIG. 10 is a diagram for illustrating a constitution example of the discovery target address management table 32200. The discovery target address management table 32200 included in the management server 30000 is constituted from a field for registering a discovery target address which the apparatus discovery program 33300 uses as the access target. FIG. 10 illustrates an example of concrete values of the discovery target address management table 32200 included in the management server 30000. Namely, the apparatus discovery program 33300 included in the management server 30000 accesses appliances whose IP addresses fall within a range of 192.168.5.1 to 192.168.5.255, then confirming whether or not a new appliance has been added.

FIG. 11 is a diagram for illustrating a constitution example of the discovered apparatus management table 32300 included in the management server 30000. The discovered apparatus management table 32300 included in the management server 300000 is constituted from the following fields: A field 32310 for registering a network IP address of the storage apparatus, host computer, or iSNS server which the apparatus discovery program 33300 has discovered, a field 32320 for registering the type of the appliance (apparatus) existing at the network address, a field 32330 for registering an identifier in the management server 30000 for the appliance (apparatus) existing at the network address, a field 32340 for registering whether or not the appliance existing at the network address is a target for the constitution-information acquisition by the management server 30000, a field 32350 for registering the user name which the information acquisition program 33200 uses when it accesses the appliance, and a field 32360 for registering the password which the unit 33200 uses with the user name.

FIG. 11 illustrates an example of concrete values of the discovered apparatus management table 32300 included in the management server 30000. Namely, the discovered apparatus management table 32300 included in the management server 30000 accesses the host computer HOST1 whose IP address is 192.168.5.5, then performing the information acquisition. Also, the user name and password which it uses at that time are "user" and "pwd", respectively.

FIG. 12A and FIG. 12B are diagrams for illustrating a constitution example of the device-coupling management table 32400 included in the management server 30000. The device-coupling management table 32400 included in the management server 300000 is constituted from the following fields: A field 32410 for registering an apparatus ID which becomes an identifier for a storage apparatus, a field 32420 for registering the volume ID which becomes an identifier for the volume included in the storage apparatus, a field 32430 for registering the iSCSI target name which becomes an identifier for the port when the volume performs communications with the host computer 10000, a field 32440 for registering the LUN ID which becomes an identifier for the volume within the iSCSI target, a field 32450 for registering the iSCSI initiator name which becomes an identifier for the port on the host side which is permitted to access the volume by the storage apparatus, a field 32460 for registering an identifier for the host computer 10000 to which the volume is coupled, and a field 32470 for registering the name of the drive in the host computer 10000 in which the volume becomes an actual entity.

Incidentally, if the management server 30000 has not acquired the constitution information on the host computer 10000 which becomes the actual entity of the volume included in the storage apparatus, or if the volume is not used by whatever host computer, the field 32460 and the field 32470 become blank fields. Also, if the storage apparatus possesses no LUN security function, no data exists in the field 32450.

FIG. 12A illustrates an example of concrete values of the device-coupling management table 32400 included in the management server 30000. Namely, the volume VOL1 on the storage apparatus SYS1 is coupled to the host computer HOST1 via the iSCSI target on the storage side indicated by com.hitachi.sto1, and the iSCSI initiator on the host side indicated by com.hitachi.sv1. Also, the volume VOL1 possesses the LUN ID of "0", and is recognized as the drive E: on the host.

Meanwhile, the volume VOL3 on the storage apparatus SYS1 gives the permission to the access from the iSCSI initiator on the host side indicated by com.hitachi.sv1. However, the management server 30000 has not acquired the constitution information on the host computer 10000 which becomes the actual entity of the volume, or the volume is not used by whatever host computer. Accordingly, the field 32460 and the field 32470 become the blank fields. Also, the storage apparatus SYS2 possesses no LUN security function. Consequently, no data exists in the field 32450 with respect to each volume of the storage apparatus SYS2.

FIG. 12B illustrates a concrete example of the device-coupling management table 32400 after the carry-out of an addition processing of an undiscovered host into the monitoring targets. The details of this processing will be described later. In the device-coupling management table 32400 illustrated in FIG. 12B, as compared with the device-coupling management table 32400 illustrated in FIG. 12A, the coupling-destination host ID 32460 and the coupling-destination drive name 32470 are added in the volume VOL3 on the storage apparatus SYS1. Similarly, the coupling-destination host ID 32460 and the coupling-destination drive name 32470 are added in the volume VOL3 on the storage apparatus SYS2.

FIG. 13 is a diagram for illustrating a constitution example of the iSCSI name management table 38200 included in the iSNS server 35000. The iSCSI name management table 38200 included in the iSNS server 35000 is constituted from the following fields: A field 38220 for registering an iSCSI name which is an identifier for the iSCSI initiator and the iSCSI target, a field 38210 for registering the IP address corresponding to the iSCSI name, and a field 38230 for registering which of the iSCSI initiator and the iSCSI target corresponds to the iSCSI name.

FIG. 13 illustrates an example of concrete values of the iSCSI name management table 38200 included in the iSNS server 35000. Namely, the iSCSI initiator on the apparatus indicated by the IP address 192.168.5.3 possesses the iSCSI name of com.hitachi.sv3.

FIG. 14 is a diagram for illustrating an example of a monitored apparatus addition screen displayed for the system manager by the management server 30000. FIG. 14 illustrates the display example of a screen for an addition operation of adding a discovered apparatus to monitoring targets, and an exclusion operation of excluding a monitoring target apparatus from the monitoring targets. In the to-monitoring-targets apparatus addition operation and from-monitoring-targets apparatus exclusion operation screen 71000, apparatus types and IP addresses of discovered apparatuses are displayed (table 71010). The manager checks an apparatus which the manager wishes to be added to the monitoring targets, then adding it to the monitoring targets by pushing down an "add-to-monitoring-targets" button (button 71020).

Also, apparatus types, IP addresses, and apparatus IDs of the monitoring target apparatuses are displayed (table 71030). The manager checks an apparatus which the manager wishes to be excluded from the monitoring targets, then excluding it from the monitoring targets by pushing down an "exclude-from-monitoring-targets" button (button 71040).

The manager adds a discovered apparatus to the monitoring targets. This addition allows the management server 30000 to periodically acquire the constitution information on the discovered apparatus. Also, when the management server 30000 periodically acquires the information such as operation situation and performance of the internal constitution components which constitute the storage apparatuses 20000 and the host computers 10000, the manager adds a discovered apparatus to the monitoring targets. This addition allows the management server 30000 to periodically acquire the operation situation and performance of the internal constitution components which constitute the discovered apparatus.

(2) Apparatus Discover and Constitution-Information Acquisition Processings in the First Embodiment FIG. 15 is a flowchart for illustrating an apparatus discovery processing carried out by the management server 30000 in the first embodiment. Reference will be made to FIG. 4 if required. FIG. 15 illustrates the apparatus discovery processing carried out by the apparatus discovery program 33300 of the management server 30000. At the time of start-up of the program, or ever time a constant time-period has elapsed from the previous apparatus discovery processing, the management program 33100 instructs the apparatus discovery program 33300 to execute the following apparatus discover processing: Incidentally, when the unit 33100 issues the execution instruction repeatedly, the instruction need not be issued on each constant time-period basis accurately, but is all right as long as it is repeated.

The apparatus discovery program 33300 executes processings within loops (i.e., the following series of processings) with respect to all the IP addresses within the discovery target address range defined on the discovery target address management table 32200 (refer to FIG. 10) (step S61010). The apparatus discovery program 33300 logs in to an apparatus on an IP address defined on the discovery target address management table 32200, using the user name and the password defined on the apparatus login ID management table 32100. Moreover, the unit 33300 instructs the apparatus on the IP address to transmit the iSNS server constitution information (step S61020). The constitution information to be acquired may be arbitrary information.

The apparatus discovery program 33300 judges whether or not a response on the iSNS server constitution information has been given from the monitoring target apparatus (step S61030). If the response on the iSNS server constitution information has been given from the monitoring target apparatus (step S61030, Yes), the apparatus discovery program 33300 judges that the apparatus is an iSNS server. Moreover, the unit 33300 stores the IP address which has returned the response into the discovered apparatus management table 32300 (refer to FIG. 11), then transferring to the processing at the next IP address (step S61040). At this time, "iSNS server" is registered into the apparatus type on the table 32300, and the user name and the password used when the constitution-information transmission request to the iSNS server is carried out are registered into the user name and the password on the table 32300.

Meanwhile, if no response on the iSNS server constitution information has been given from the monitoring target apparatus (step S61030, No), the apparatus discovery program 33300, using the user name and the password defined on the apparatus login ID management table 32100, logs in to the apparatus on the IP address defined on the discovery target address management table 32200, then instructing the apparatus to transmit the storage-apparatus constitution information (step S61050). The constitution information to be acquired may be arbitrary information.

The apparatus discovery program 33300 judges whether or not a response on the storage-apparatus constitution information has been given from the monitoring target apparatus (step S61060). If the response on the storage-apparatus constitution information has been given from the monitoring target apparatus (step S61060, Yes); the apparatus discovery program 33300 judges that the apparatus is a storage apparatus. Moreover, the unit 33300 stores the IP address which has returned the response into the discovered apparatus management table 32300 (refer to FIG. 11), then transferring to the processing at the next IP address (step S61070). At this time, "storage" is registered into the apparatus type on the table 32300, and the user name and the password used when the constitution-information transmission request to the storage apparatus is carried out are registered into the user name and the password on the table 32300.

Meanwhile, if no response on the storage-apparatus constitution information has been given from the monitoring target apparatus (step S61060, No), the apparatus discovery program 33300, using the user name and the password defined on the apparatus login ID management table 32100, logs in to the apparatus on the IP address defined on the discovery target address management table 32200, then instructing the apparatus to transmit the host-computer constitution information (step S61080). The constitution information to be acquired may be arbitrary information.

The apparatus discovery program 33300 judges whether or not a response on the host-computer constitution information has been given from the monitoring target apparatus (step S61090). If the response on the host-computer constitution information has been given from the monitoring target apparatus (step S61090, Yes), the apparatus discovery program 33300 judges that the apparatus is a host computer. Moreover, the unit 33300 stores the IP address which has returned the response into the discovered apparatus management table 32300, then transferring to the processing at the next IP address (step S61100). At this time, "host computer" is registered into the apparatus type on the table 32300, and the user name and the password used when the constitution-information transmission request to the host computer is carried out are registered into the user name and the password on the table 32300.

Meanwhile, if no response on the host-computer constitution information has been given from the monitoring target apparatus (step S61090, No), the apparatus discovery program 33300 transfers to the processing at the next IP address.

The above-described processing is the apparatus discover processing carried out by the apparatus discovery program 33300.

FIG. 16 is a flowchart for illustrating a constitution-information acquisition processing carried out by the management server 30000 in the first embodiment. Reference will be made to FIG. 4 if required. FIG. 16 illustrates the constitution-information acquisition processing carried out by the information acquisition program 33200 of the management server 30000. At the time of start-up of the program, or ever time a constant time-period has elapsed from the previous constitution-information acquisition processing, the management program 33100 instructs the information acquisition program 33200 to execute the following constitution-information acquisition processing: Incidentally, when the unit 33100 issues the execution instruction repeatedly, the instruction need not be issued on each constant time-period basis accurately, but is all right as long as it is repeated.

The information acquisition program 33200 executes processings within loops (i.e., the following series of processings) with respect to each apparatus of a monitoring target defined on the discovered apparatus management table 32300 (refer to FIG. 11) (step S62010). Of the apparatuses defined on the discovered apparatus management table 32300, the information acquisition program 33200 logs in to each apparatus whose monitoring-target flag field 32340 is "Yes", i.e., each apparatus which has become a monitoring target. This log-in is performed using the user name and the password defined on the table 32300. Moreover, the information acquisition program 33200 instructs each apparatus to transmit the constitution information (step S62020). At this time, the unit 33200 confirms the apparatus type of each IP address. Then, if the apparatus type is "host computer", the unit 33200 acquires, as the constitution information, the information illustrated on the logical volume management tables 13300 (refer to FIG. 6A to FIG. 6C). If the apparatus type is "storage apparatus", the unit 33200 acquires, as the constitution information, the information illustrated on the volume management table 23200 (refer to FIG. 7) and the iSCSI target management table (refer to FIG. 8A and FIG. 8B).

The information acquisition program 33200 judges whether or not a response on the constitution information has been given from each monitoring target apparatus (step S62030). If the response on the constitution information has been given from the monitoring target apparatus (step S62030, Yes), the information acquisition program 33200 stores the acquired constitution information into the acquired information repository 32000 (step S62040).

After the information acquisition program 33200 has terminated the above-described processing with respect to all the apparatuses of the monitoring targets defined on the discovered apparatus management table 32300, the unit 33200 makes reference to the constitution information stored into the acquired information repository 32000, then updating the devices connection management table 32400 (step S62050).

Hereinafter, the explanation will be given below regarding processing steps of updating the device-coupling management table 32400 (refer to FIG. 12A and FIG. 12B) at the step S62050. First, the information acquisition program 33200 makes reference to the volume management table 23200 stored into the acquired information repository 32000. Moreover, the unit 33200 confirms the iSCSI target name to which the volume is coupled and the iSCSI initiator name accessible to the volume, then registering the names into the device-coupling management table 32400. Next, the unit 33200 makes reference to the logical volume management table 13300. If the unit 33200 discovers a pair of a storage volume and a host drive which use the same iSCSI initiator name as the above-described iSCSI initiator name, which are coupled to the storage-side port having the above-described iSCSI target name, and whose LUN IDs are equal to each other, the unit 33200 registers the pair of the storage volume and the host drive into the device-coupling management table 32400, assuming that the storage volume and the host drive are in a mutually-coupled relationship.

The above-described processing is the constitution-information acquisition processing carried out by the information acquisition program 33200.

(3) Addition Processing of Undiscovered Host into Monitoring Targets in the First Embodiment FIG. 17A is a flowchart for illustrating an undiscovered-host addition processing into the monitoring targets, which is carried out by the management server 30000 in the first embodiment. Reference will be made to FIG. 4 if required. FIG. 17A illustrates the undiscovered-host addition processing into the monitoring target, which is carried out by the management program 33100 of the management server 30000. The present processing is automatically activated immediately after the apparatus discovery processing in FIG. 15 and the constitution-information acquisition processing in FIG. 16 have been completed. The present processing, however, may also be activated based on the instruction by the manager.

The management program 33100 makes reference to the discovered apparatus management table 32300 then to retrieve an iSNS server (step S63000), thereby judging whether or not the iSNS server has been discovered (step S63010). If the iSNS server has been discovered (step S63010, Yes), the management program 33100 makes reference to the device-coupling management table 32400, thereby detecting a list of storage-apparatus volumes whose coupling-destination hosts are unknown (step S63020). Then, the unit 33100 repeats the following processing with respect to the storage-apparatus volumes whose coupling-destination hosts are unknown (step S63030).

The management program 33100 confirms whether or not, with respect to the detected volumes, the accessible iSCSI initiator name is present (i.e., is registered) in the device-coupling management table 32400 (step S63040).

Figure 17B:
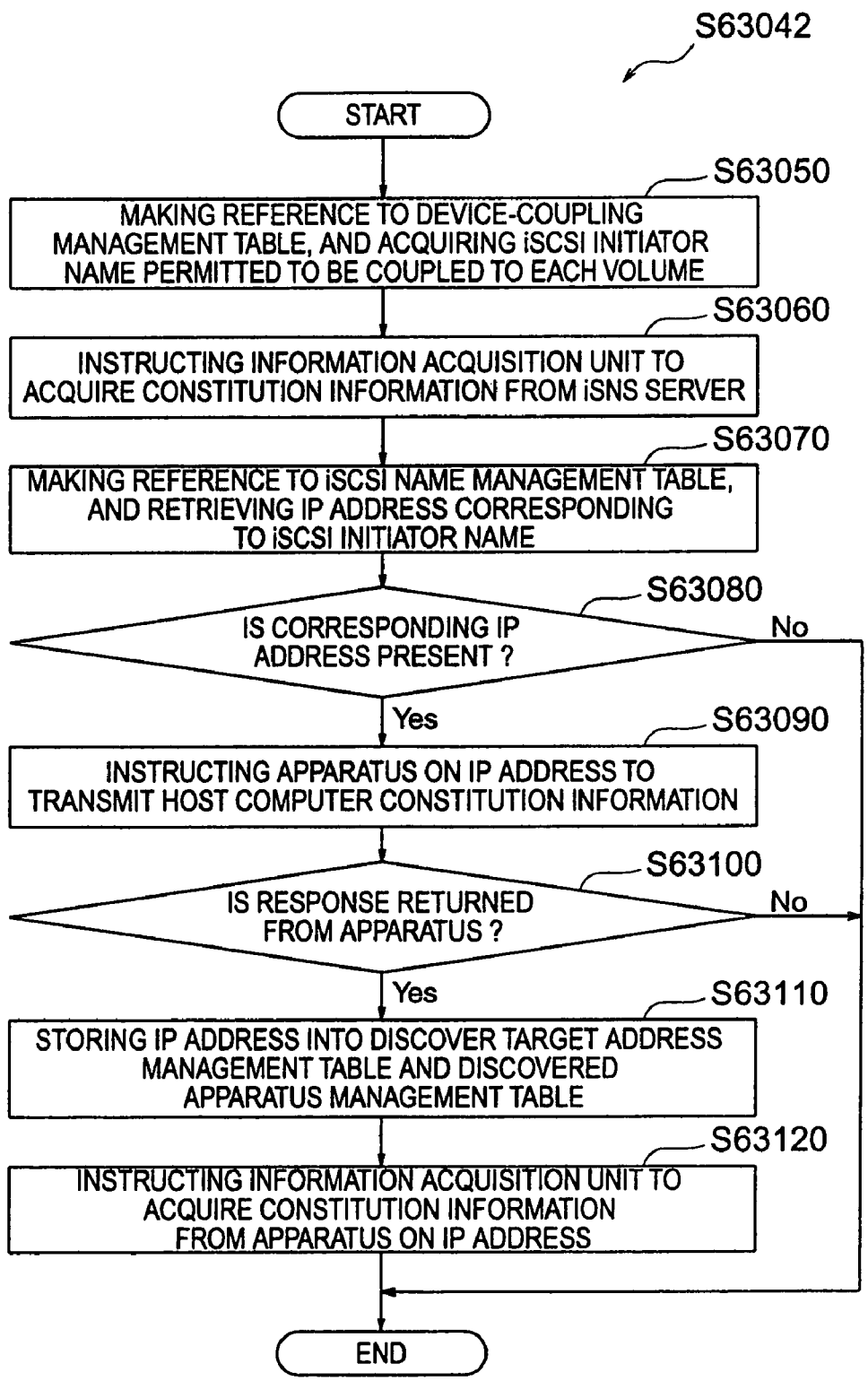
FIG. 17B is a flowchart for illustrating an IP-address detection processing based on an iSNS server inquiry.

If the accessible iSCSI initiator name is registered (step S63040, Yes), the management program 33100 executes an IP-address detection processing based on an iSNS server inquiry, which is illustrated in FIG. 17B (step S63042). After having repeated the above-described processing with respect to all of the detected volumes, the management program 33100 terminates the processing.

Figure 17C:
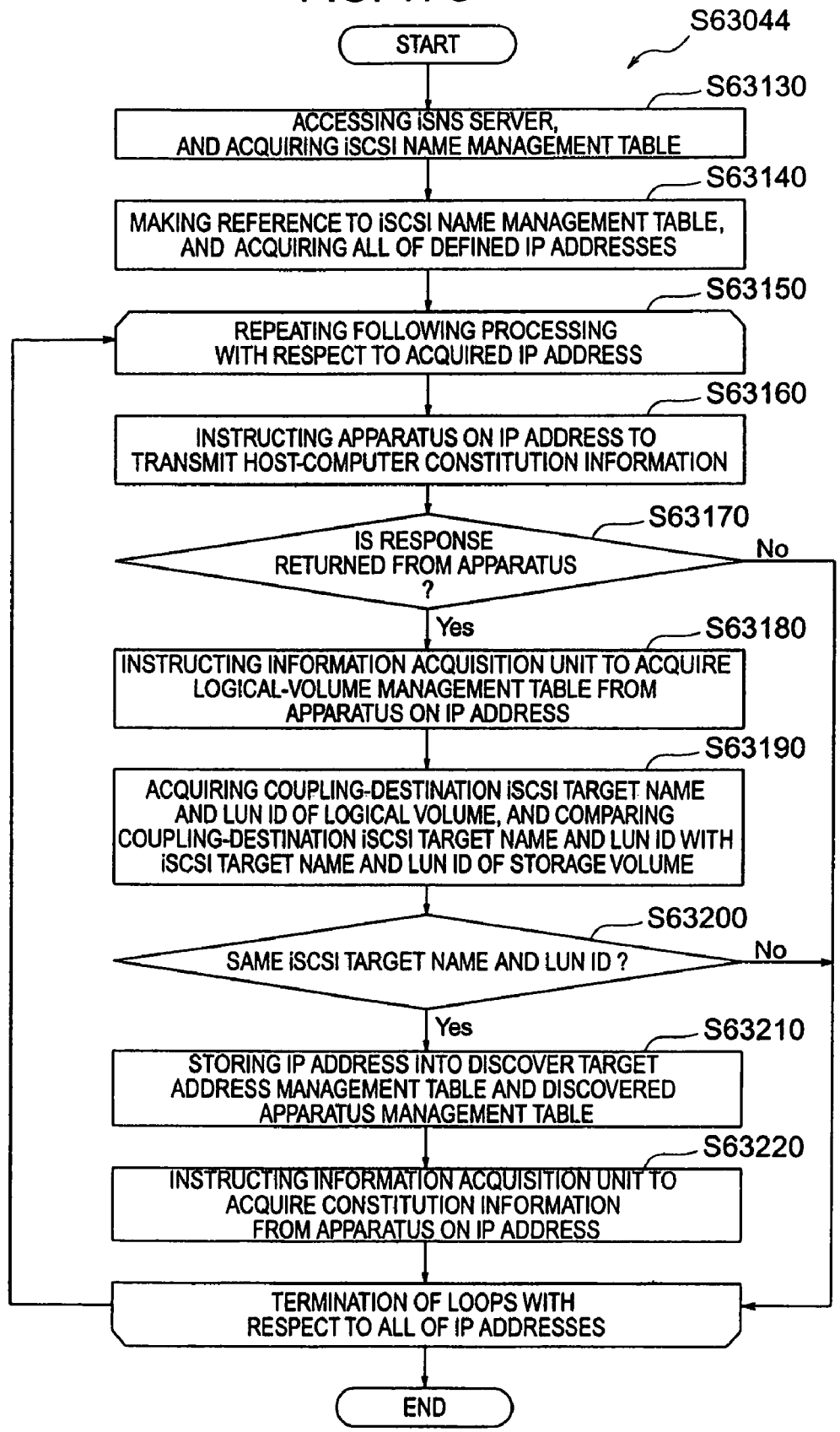
FIG. 17C is a flowchart for illustrating the IP-address detection processing based on the iSNS server inquiry and a host-computer inquiry.

Meanwhile, if, at the step S63040, no accessible iSCSI initiator name is registered (step S63040, No), the management program 33100 executes the IP-address detection processing based on the iSNS server inquiry and a host-computer inquiry, which is illustrated in FIG. 17C (step S63044). After having repeated the above-described processing with respect to all of the detected volumes, the management program 33100 terminates the processing.

Figure 17D:
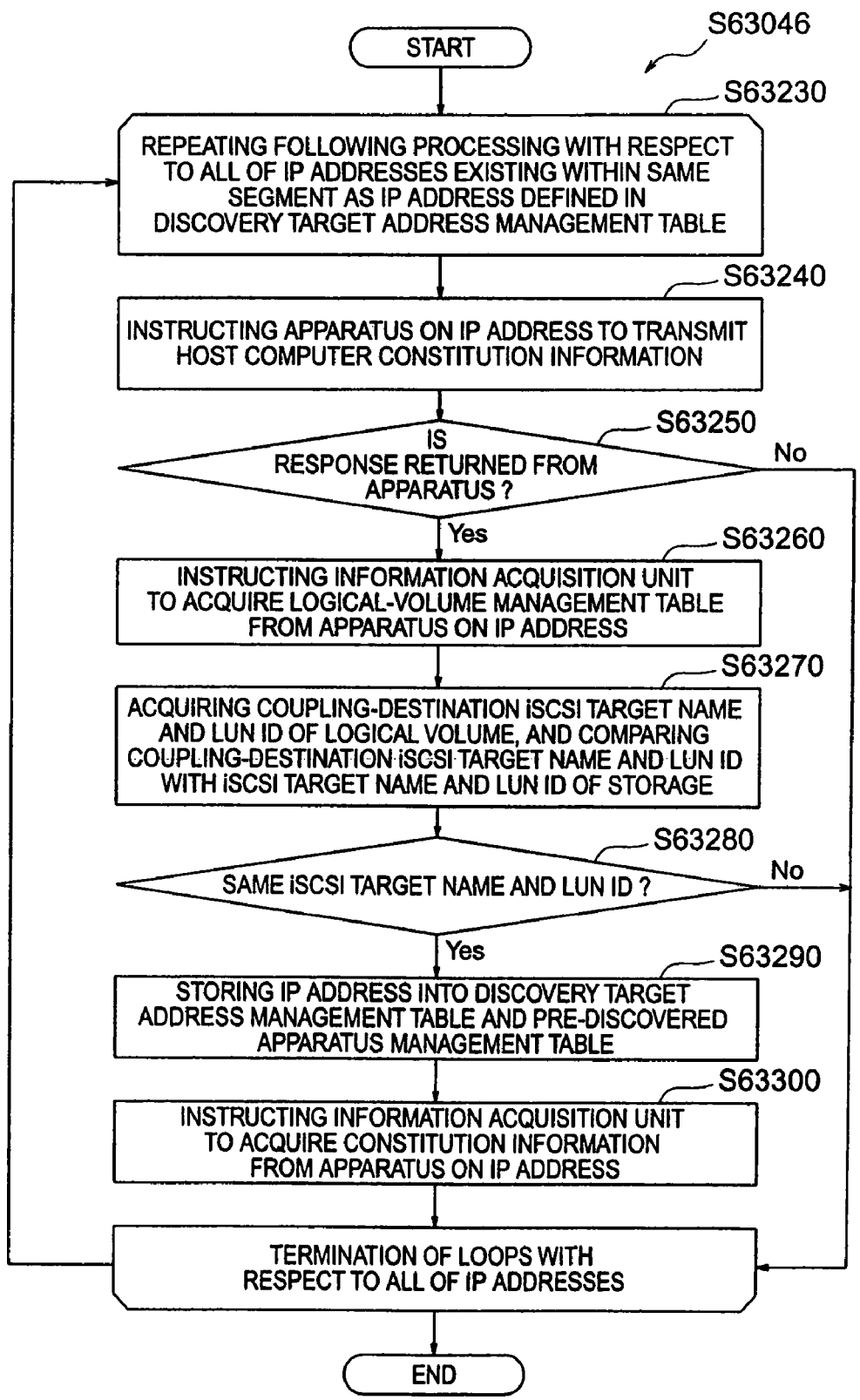
FIG. 17D is a flowchart for illustrating the IP-address detection processing based on the host-computer inquiry.

Meanwhile, if, at the step S63010, no iSNS server has been discovered (step S63010, No), the management program 33100 executes the IP-address detection processing based on the host-computer inquiry, which is illustrated in FIG. 17D (step S63046). After having repeated the above-described processing with respect to all of the detected volumes, the management program 33100 terminates the processing.

The above-described processing is the undiscovered-host addition processing into the monitoring targets, which is carried out by the management program 33100.

FIG. 17B is a flowchart for illustrating the IP-address detection processing based on the iSNS server inquiry. The management program 33100 of the management server 30000 makes reference to the device-coupling management table 32400 (refer to FIG. 12A), thereby acquiring the iSCSI initiator name which is permitted to be coupled to each volume (step S63050). Next, the management program 33100 instructs the information acquisition program 33200 to acquire the constitution information from the iSNS server 35000 (step S63060). The information acquisition program 33200 accesses the iSNS server 35000, thereby acquiring the iSCSI name management table 38200 to store it into the acquired information repository 32000. The information acquisition program 33200 which has received the instruction executes the processings from the step S62020 to the step S62040 in FIG. 16. The IP address of the iSNS server is acquired from the discovered apparatus management table 32300 (refer to FIG. 11).

Next, the management program 33100 makes reference to the iSCSI name management table 38200 (refer to FIG. 13) then to retrieve an IP address corresponding to the above-described iSCSI initiator name (step S63070), thereby judging whether or not the corresponding IP address is present (step S63080). If the corresponding IP address is absent on the iSCSI name management table 38200 (step S63080, No), the unit 33100 terminates the processing then to transfer to the processing for the next volume.

Meanwhile, if the corresponding IP address is present on the iSCSI name management table 38200 (step S63080, Yes), the management program 33100 instructs an apparatus on the IP address to transmit the host-computer constitution information (step S63090). The constitution information to be acquired may be arbitrary information. The management program 33100 judges whether or not a response on the storage constitution information has been given from the apparatus (step S63100). Then, if no response has been given from the apparatus (step S63100, No), the unit 33100 terminates the processing then to transfer to the processing for the next volume.

Meanwhile, if the response has been given from the apparatus (step S63100, Yes), the management program 33100 stores the IP address into the discovery target address management table 32200 and the discovered apparatus management table 32300 (step S63110). After that, the management program 33100 instructs the information acquisition program 33200 to acquire the constitution information from the apparatus on the IP address (step S63120). The information acquisition program 33200 which has received the instruction executes the processings from the step S62020 to the step S62040, and the step S62050 in FIG. 16.

The above-described processing is the IP-address detection processing based on the iSNS server inquiry, which is carried out by the management program 33100.

FIG. 17C is a flowchart for illustrating the IP-address detection processing based on the iSNS server inquiry and the host-computer inquiry. The management program 33100 of the management server 30000 instructs the information acquisition program 33200 to acquire the constitution information from the iSNS server 35000 (step S63130). The information acquisition program 33200 accesses the iSNS server 35000, thereby acquiring the iSCSI name management table 38200 to store it into the acquired information repository 32000. The IP address of the iSNS server is acquired from the discovered apparatus management table 32300.

Next, the management program 33100 makes reference to the iSCSI name management table 38200, thereby acquiring all of the IP addresses which are defined (i.e., registered) in the management table 38200 (step S63140). Then, the management program 33100 repeats the following processing with respect to all of the IP addresses acquired (step S63150).

The management program 33100 instructs an apparatus on the above-described IP address to transmit the host-computer constitution information (step S63160). The constitution information to be acquired may be arbitrary information. The management program 33100 judges whether or not a response on the storage constitution information has been given from the apparatus (step S63170). Then, if no response on the storage constitution information has been given from the apparatus (step S63170, No), the unit 33100 terminates the processing then to transfer to the processing for the next IP address.

Meanwhile, if the response has been given from the apparatus (step S63170, Yes), the management program 33100 instructs the information acquisition program 33200 to acquire the logical volume management table 13300 from the apparatus on the IP address (step S63180). The information acquisition program 33200 which has received the instruction executes the processings from the step S62020 to the step S62040 in FIG. 16, then storing the acquired logical volume management table 13300 into the acquired information repository 32000.

Next, the management program 33100 acquires the coupling-destination iSCSI target name and LUN ID of each logical volume registered in the logical volume management table 13300, then comparing the coupling-destination iSCSI target name and LUN ID with the iSCSI target name and LUN ID of each storage volume registered in the device-coupling management table 32400 (step S63190).

The management program 33100 judges whether or not a logical volume having the same iSCSI target name and LUN ID is present on the logical volume management table 13300 (step S63200). If the logical volume having the same iSCSI target name and LUN ID is absent on the logical volume management table 13300 (step S63200, No), the unit 33100 terminates the processing then to transfer to the processing for the next IP address.

Meanwhile, if the logical volume having the same iSCSI target name and LUN ID is present on the logical volume management table 13300 (step S63200, Yes), the management program 33100 stores the IP address into the discovery target address management table 32200 and the discovered apparatus management table 32300 (step S63210). After that, the management program 33100 instructs the information acquisition program 33200 to acquire the constitution information from the apparatus on the IP address (step S63220). The information acquisition program 33200 which has received the instruction executes the processings from the step S62020 to the step S62040, and the step S62050 in FIG. 16.

The above-described processing is the IP-address detection processing based on the iSNS server inquiry and the host-computer inquiry, which is carried out by the management program 33100.

FIG. 17D is a flowchart for illustrating the IP-address detection processing based on the host-computer inquiry. The management program 33100 of the management server 30000 repeats the following processing with respect to all of IP addresses which exist within the same segment as an IP address defined (i.e., registered) in the discovery target address management table 32200 (step S63230).

The management program 33100 instructs an apparatus on the above-described IP address to transmit the host-computer constitution information (step S63240). The constitution information to be acquired may be arbitrary information. The management program 33100 judges whether or not a response on the host-computer constitution information has been given from the apparatus (step S63250). Then, if no response on the host-computer constitution information has been given from the apparatus (step S63250, No), the unit 33100 terminates the processing then to transfer to the processing for the next IP address.

Meanwhile, if the response has been given from the apparatus (step S63250, Yes), the management program 33100 instructs the information acquisition program 33200 to acquire the logical volume management table 13300 from the apparatus on the IP address (step S63260). The information acquisition program 33200 which has received the instruction executes the processings from the step S62020 to the step S62040 in FIG. 16, then storing the acquired logical volume management table 13300 into the acquired information repository 32000.

Next, the management program 33100 acquires the coupling-destination iSCSI target name and LUN ID of each logical volume registered in the logical volume management table 13300. Then, the unit 33100 compares the coupling-destination iSCSI target name and LUN ID with the iSCSI target name and LUN ID of each storage volume registered in the device-coupling management table 32400 (step S63270), thereby judging whether or not they are the same iSCSI target name and LUN ID (step S63280).

If the logical volume having the same iSCSI target name and LUN ID is absent on the logical volume management table 13300 and the device-coupling management table 32400 (step S63280, No), the unit 33100 terminates the processing then to transfer to the processing for the next IP address.

Meanwhile, if the logical volume having the same iSCSI target name and LUN ID is present on the logical volume management table 13300 and the device-coupling management table 32400 (step S63280, Yes), the management program 33100 stores the IP address into the discovery target address management table 32200 and the discovered apparatus management table 32300 (step S63290). After that, the management program 33100 instructs the information acquisition program 33200 to acquire the constitution information from the apparatus on the IP address (step S63300). The information acquisition program 33200 which has received the instruction executes the processings from the step S62020 to the step S62040, and the step S62050 in FIG. 16. When the information acquisition program 33200 has completed the processings, the management program 33100 transfers to the processing for the next IP address.

After having repeated the above-described processing with respect to all of the IP addresses which exist within the same segment as the IP address defined in the discovery target address management table, the management program 33100 terminates the series of processings.

The above-described processing is the IP-address detection processing based on the host-computer inquiry, which is carried out by the management program 33100.

Hereinafter, the presentation will be given below concerning concrete examples of the undiscovered-host addition processing into the monitoring targets.

The management program 33100 makes reference to the discovered apparatus management table 32300 illustrated in FIG. 11, thereby judging whether or not the iSNS server has been discovered. Since the iSNS server has been discovered, the management program 33100 makes reference to the device-coupling management table 32400 illustrated in FIG. 12A, thereby detecting a list of the storage volumes whose coupling-destination hosts are unknown.

The management program 33100 confirms whether or not, with respect to the volume VOL3 within the detected storage apparatus SYS1, the accessible iSCSI initiator name is registered in the device-coupling management table 32400. Since the accessible iSCSI initiator name is registered with respect to the volume VOL3 within SYS1, the management program 33100 executes the IP-address detection processing based on the iSNS server inquiry, which will be described hereinafter:

The management program 33100 makes reference to the device-coupling management table 32400 illustrated in FIG. 12A, thereby acquiring the iSCSI initiator name "com.hitachi.sv2" permitted to be coupled to the volume VOL3 within SYS1. Next, the management program 33100 instructs the information acquisition program 33200 to acquire the constitution information from the iSNS server 35000. The information acquisition program 33200 accesses the iSNS server ISNS1, thereby acquiring the iSCSI name management table 38200 to store it into the acquired information repository 32000.

Next, the management program 33100 makes reference to the iSCSI name management table 38200 illustrated in FIG. 13, thereby acquiring the IP address "192.168.5.4" corresponding to the iSCSI initiator name "com.hitachi.sv2". The management program 33100 instructs an apparatus on the IP address "192.168.5.4" to transmit the host-computer constitution information. The constitution information to be acquired may be arbitrary information.

If the response has been given from the apparatus, the management program 33100 stores the IP address "192.168.5.4" into the discovery target address management table 32200 illustrated in FIG. 10 and the discovered apparatus management table 32300 illustrated in FIG. 11. After that, the management program 33100 instructs the information acquisition program 33200 to acquire the constitution information from the apparatus on the IP address "192.168.5.4".

Next, the management program 33100 confirms whether or not, with respect to the volume VOL3 within the detected storage apparatus SYS2, the accessible iSCSI initiator name is registered in the device-coupling management table 32400. Since the accessible iSCSI initiator name is not registered with respect to the volume VOL3 within SYS2, the management program 33100 executes the IP-address detection processing based on the iSNS server inquiry and the host-computer inquiry, which will be described hereinafter:

The management program 33100 instructs the information acquisition program 33200 to acquire the constitution information from the iSNS server 35000. The information acquisition program 33200 accesses the iSNS server ISNS1, thereby acquiring the iSCSI name management table 38200 illustrated in FIG. 13, and then storing it into the acquired information repository 32000.

Next, the management program 33100 makes reference to the iSCSI name management table 38200 illustrated in FIG. 13, thereby acquiring all of the IP addresses defined in the management table 38200. The management program 33100 instructs an apparatus on the acquired IP address "192.168.5.3" to transmit the host-computer constitution information. The constitution information to be acquired may be arbitrary information. If the response has been given from the apparatus, the management program 33100 instructs the information acquisition program 33200 to acquire the logical volume management table 13300 from the apparatus on the IP address "192.168.5.3". The information acquisition program 33200 which has received the instruction stores the logical volume management table illustrated in FIG. 6C into the acquired information repository 32000.

Next, the management program 33100 acquires the coupling-destination iSCSI target name and LUN ID of each logical volume defined in the logical volume management table illustrated in FIG. 6C, then comparing the coupling-destination iSCSI target name and LUN ID with the iSCSI target name "com.hitachi.sto12" and LUN ID "0" of the volume VOL3 within the storage apparatus SYS2 registered in the device-coupling management table 32400 illustrated in FIG. 12A.

Since the same iSCSI target name is present on the logical volume management table illustrated in FIG. 6C, the management program 33100 stores the IP address "192.168.5.3" into the discovery target address management table 32200 illustrated in FIG. 10 and the discovered apparatus management table 32300 illustrated in FIG. 11. After that, the management program 33100 instructs the information acquisition program 33200 to acquire the constitution information from the apparatus on the IP address "192.168.5.3".

Also, the management program 33100 makes reference to the discovered apparatus management table 32300 illustrated in FIG. 11. Then, if the iSNS server has been not discovered, the unit 33100 repeats the following processing with respect to all of IP addresses which exist within the same segment as an IP address defined in the discovery target address management table 32200.

The management program 33100 instructs an apparatus on the IP address "192.168.5.3" to transmit the host-computer constitution information. The constitution information to be acquired may be arbitrary information. If the response on the host-computer constitution information has been given from the apparatus, the management program 33100 instructs the information acquisition program 33200 to acquire the logical volume management table illustrated in FIG. 6C from the apparatus on the IP address "192.168.5.3".

Next, the management program 33100 acquires the coupling-destination iSCSI target name of each logical volume defined in the logical volume management table illustrated in FIG. 6C, then comparing the coupling-destination iSCSI target name with the iSCSI target name of each volume registered in the device-coupling management table 32400 illustrated in FIG. 12A.

The volume having the same iSCSI target name "com.hitachi.sto12" and LUN ID "0" exists in both of the logical volume management table illustrated in FIG. 6C and the device-coupling management table 32400 illustrated in FIG. 12A. Accordingly, the management program 33100 stores the IP address "192.168.5.3" into the discovery target address management table 32200 illustrated in FIG. 10 and the discovered apparatus management table 32300 illustrated in FIG. 11. After that, the management program 33100 instructs the information acquisition program 33200 to acquire the constitution information from the apparatus on the IP address "192.168.5.3". When the above-described processing has been completed, the management program 33100 transfers to the processing for the next IP address.

After having repeated the above-described processing with respect to all of the IP addresses which exist within the same segment as the IP address defined in the discovery target address management table 32200, the management program 33100 terminates the processings. The above-described processing updates the device-coupling management table 32400, thereby bringing the device-coupling management table into the state illustrated in FIG. 12B.

As having been explained so far, according to the present embodiment, carrying out the undiscovered-host addition processing into monitoring targets allows the management software to add, into the monitoring targets by the management software, a host which is making an access to a storage apparatus that has been added into the monitoring targets by the manager.

Eventually, it is effective enough for the manager to add only the IP address of the storage into the discovery target address management table. As a consequence, the management software finds it possible to avoid repeatedly accessing an IP address at which no node exists, or an IP address which is utilized by an IT appliance that does not become the monitoring target by the management software.

Embodiment 2

In the second embodiment, the explanation will be given below concerning a method for allowing the management software to prompt the manager to exclude a monitoring-target node from the monitoring targets on a GUI. This exclusion is performed when an access from the management software to the monitoring-target node becomes impossible for a certain constant time-period due to a reason such that the monitoring-target node has been excluded from the network.

(1) System Constitution in the Second Embodiment

The constitution of each appliance in the second embodiment is basically the same as the one in the first embodiment. Accordingly, the explanation thereof will be omitted here. Instead, referring to FIG. 18, FIG. 19A, FIG. 19B, and FIG. 20, the explanation will be given below regarding the points which differ from the first embodiment. Incidentally, reference is made to the constitution of the information processing system illustrated in FIG. 1 to FIG. 4, the constitutions of the apparatuses coupled to the information processing system, and the management information included in each apparatus illustrated in FIG. 5 to FIG. 13.

FIG. 18 is a diagram for illustrating a constitution example of the discovered apparatus management table 32300 included in the management server 30000 in the second embodiment. In the present discovered apparatus management table 32300 included in the management server 30000, the point which differs from the discovered apparatus management table 32300 illustrated FIG. 11 is as follows: Namely, there exists a field 32370 for registering the time-and-date at which the apparatus discovery program 33300 found it successful for the last time to access the storage apparatus, host computer, or iSNS server which the apparatus discovery program 33300 had discovered.

(2) Apparatus Discovery Processing in the Second Embodiment

FIG. 19A is a flowchart for illustrating the apparatus discovery processing carried out by the management server 30000 in the second embodiment. With respect to the flowchart illustrated in FIG. 19A for the apparatus discovery processing carried out by the apparatus discovery program 33300 of the management server 30000, the explanation will be given below regarding the points which differ from the apparatus discovery processing illustrated in FIG. 15. Incidentally, each step of the step S64010 to the step S64110 illustrated in FIG. 19A corresponds to each step of the step S61010 to the step S61110 illustrated in FIG. 15. In FIG. 19A, a step S64105 is added further.

At the step S64040, at the time when storing the IP address which has returned the response into the discovered apparatus management table 32300, when "iSNS server" is registered into the apparatus type, and the user name and the password used when the constitution-information transmission request to the iSNS server is carried out are registered into the user name and the password, the access success time-and-date is updated to the time-and-date at present. At the step S64070, at the time when storing the IP address which has returned the response into the discovered apparatus management table 32300, when "storage" is registered into the apparatus type, and the user name and the password used when the constitution-information transmission request to the storage apparatus is carried out are registered into the user name and the password, the access success time-and-date is updated to the time-and-date at present.

Similarly, at the step S64100, at the time when storing the IP address which has returned the response into the discovered apparatus management table 32300, when "host" is registered into the apparatus type, and the user name and the password used when the constitution-information transmission request to the host computer is carried out are registered into the user name and the password, the access success time-and-date is updated to the time-and-date at present.

Figure 19B:
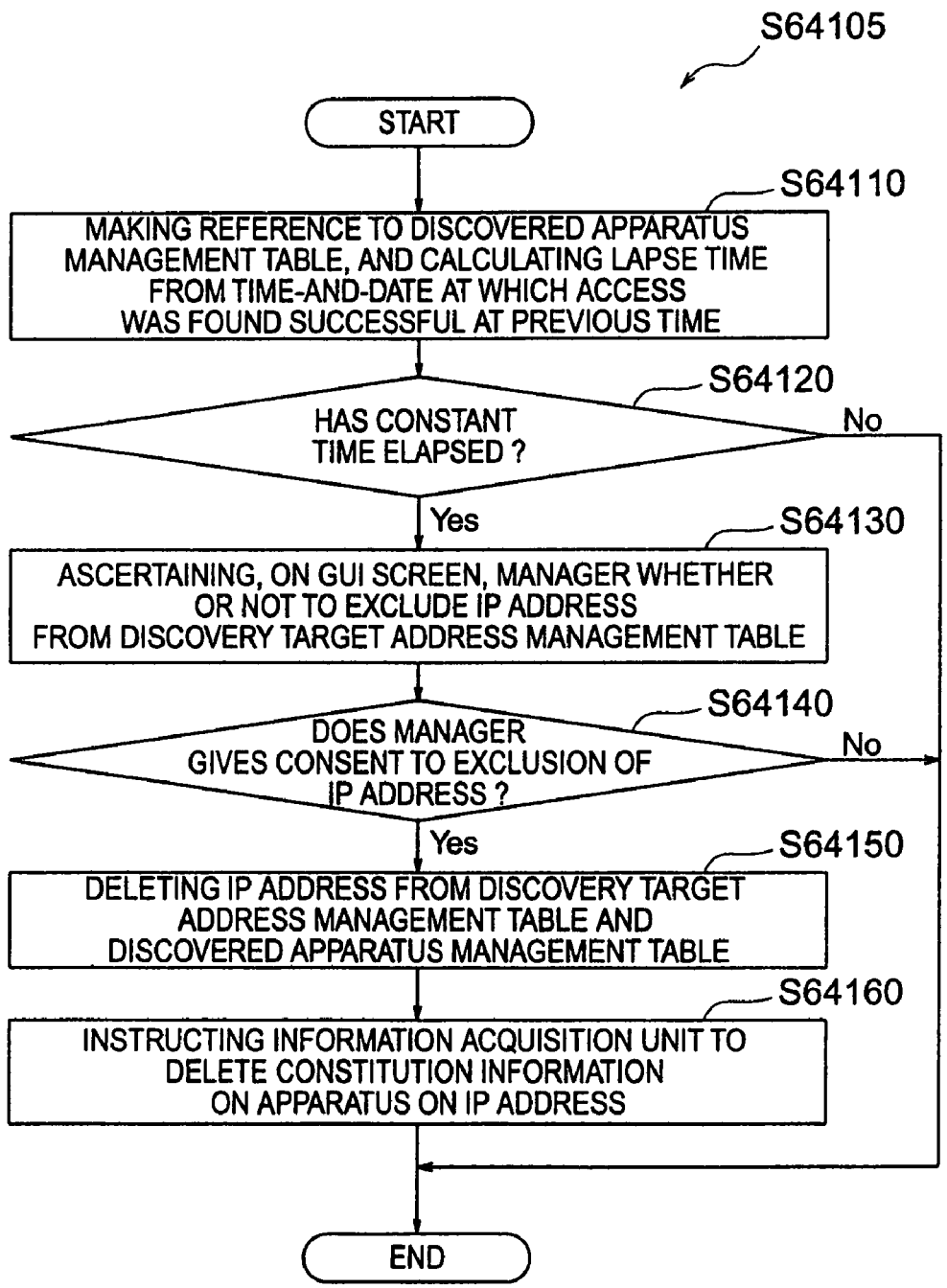
FIG. 19B is a flowchart for illustrating an IP-address deletion processing carried out by the management server in the second embodiment.

Meanwhile, if, at the step S64090, no response on the host-computer constitution information has been given from the apparatus (step S64090, No), the apparatus discovery program 33300 executes an IP-address deletion processing (S64105) illustrated in FIG. 19B.

FIG. 19B is a flowchart for illustrating the IP-address deletion processing carried out by the management server 30000. The apparatus discovery program 33300 of the management server 30000 makes reference to the discovered apparatus management table 32300, then calculating a lapse time which has elapsed from the time-and-date, at which the apparatus discovery program 33300 found it successful at the previous time to access the IP address, to the present time-and-date (step S64110).

The apparatus discovery program 33300 judges whether or not a predetermined time (constant time) has elapsed (step S64120). If the calculated lapse time has been found to be longer than the predetermined time (step S64120, Yes), the apparatus discovery program 33300, on the GUI screen illustrated in FIG. 20, ascertains the manager whether or not to exclude the IP address from the discovery target address management table 32200 (step S64130). The apparatus discovery program 33300 judges whether or not the manager gives consent to the exclusion of the IP address (step S64140). If the manager gives the consent to the exclusion of the IP address (step S64140, Yes), the apparatus discovery program 33300 deletes the IP address from the discovery target address management table 32200 and the discovered apparatus management table 32300 (step S64150). Furthermore, the apparatus discovery program 33300 instructs the information acquisition program 33200 to delete the constitution information on the apparatus on the IP address (step S64160).

Meanwhile, if, at the step S64120, the predetermined time has not elapsed (step S64120, No), the apparatus discovery program 33300 terminates the processing. Also, if, at the step S64140, the manager gives no consent to the exclusion of the IP address (step S64140, No), the apparatus discovery program 33300 terminates the processing. The above-described processing is the IP-address deletion processing carried out by the apparatus discovery program 33300.

Figure 20:
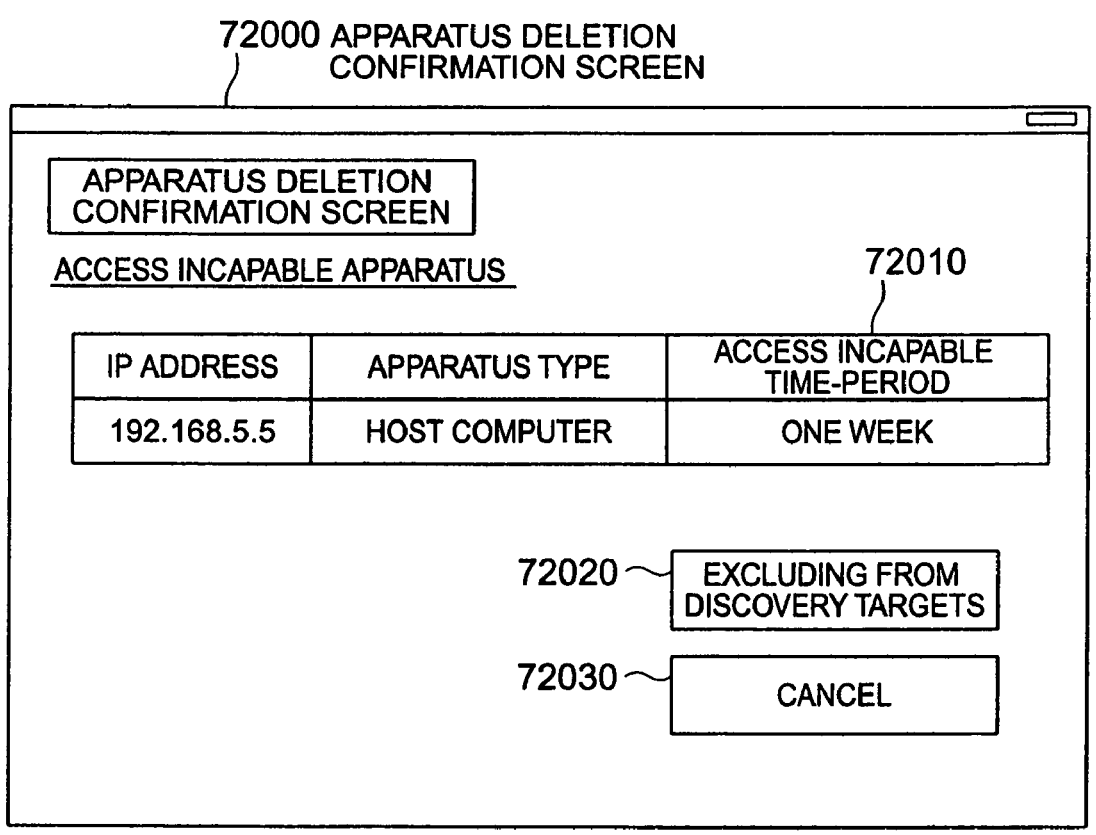
FIG. 20 is a diagram for illustrating an example of an apparatus-deletion confirmation screen displayed by the management server.

FIG. 20 is a diagram for illustrating an example of an apparatus-deletion confirmation screen which is displayed with respect to the system manager on the output unit 34000 by the management server 30000. FIG. 20 illustrates the apparatus-deletion confirmation screen 72000 for confirming the deletion of an access-incapable apparatus from discovery targets. In the apparatus-deletion confirmation screen 72000, the apparatus type, IP address, and access-incapable time-period of the access-incapable apparatus are displayed (table 72010). By pushing down an "excluding-from-discovery-targets" button (button 72020), the manager excludes the access-incapable apparatus from the discovery targets in the flow-chart illustrated in FIG. 19B. Also, the exclusion from the discovery targets is not performed if the manager pushes down a "cancel" button (button 72030).

As having been explained so far, according to the present embodiment, carrying out the apparatus discovery processing allows the management software to prompt the manager to exclude a monitoring-target node from the monitoring targets on a GUI. This exclusion is performed when, e.g., the monitoring-target node is excluded from the network. As a consequence, the management software finds it possible to avoid repeatedly accessing an IP address at which no node exists.

Incidentally, in FIG. 19B, the management server 30000 has identified the IP address of the deletion target by taking into consideration the lapse time which has elapsed from the time-and-date at which the access was found successful at previous time. The present embodiment, however, is not limited thereto. For example, the management server 30000 is also allowed to include a failure-event acquisition program for acquiring the event of a failure on the network. The failure-event acquisition program detects an event which becomes a cause from among a plurality of detected failures or their symptoms, the cause making no access executable to an apparatus which the unit 33300 had recognized as the monitoring target. Then, if the failure-event acquisition program confirms that the cause is power-supply down of the apparatus (i.e., power-supply of the apparatus is switched off) or removal of the apparatus, the failure-event acquisition program displays, on the output unit 34000, that the apparatus is an apparatus which should be excluded from the monitoring targets.

According to the first embodiment, if both of the LUN security information on the storage apparatuses and the configuration information on the iSNS server are acquirable, the management software installed into the management server 30000 makes reference to the configuration situation of the LUN security acquired from a monitoring-target storage apparatus, thereby acquiring iSCSI initiator names which are permitted to access the storage apparatus. Moreover, the management software acquires, from the iSNS server, the IP address of an iSCSI initiator name which does not exist on a monitoring-target host out of the iSCSI initiator names, then adding the IP address into the monitoring targets.

Also, if the configuration information on the iSNS server is acquirable, the management software acquires the IP address of an iSCSI initiator registered in the iSNS server, then acquiring the coupling-destination iSCSI target name from the host on the IP address. Then, if the iSCSI target name is of a monitoring-target storage apparatus, the management software is capable of adding the host on the IP address into the monitoring targets.

Also, if the configuration information on the iSNS server is not acquirable, the management software acquires the coupling-destination iSCSI target names from hosts on all of IP addresses which exist within the same segment as the IP address of an appliance which the manager has defined and has wished to be treated as a monitoring target. Then, if the iSCSI target names are of monitoring-target storage apparatuses, the management software is capable of adding the hosts on all of the IP addresses into the monitoring targets.

Also, according to the second embodiment, the management software is capable of prompting the manager to exclude a monitoring-target node from the monitoring targets on a GUI. This exclusion is performed when an access from the management software to the monitoring-target node becomes impossible for a certain constant time-period due to a reason such that the monitoring-target node has been excluded from the network.

The management software is capable of avoiding repeatedly accessing an IP address at which no node exists, or an IP address which is utilized by an IT appliance that does not become the monitoring target by the management software, and of necessitating a tremendous processing time for the discovery of the monitoring-target apparatuses.

According to the present embodiment, if both of the LUN security information on the storage apparatuses 20000 and the configuration information on the iSNS server 35000 are acquirable, the management server 30000 makes reference to the configuration situation of the LUN security acquired from a monitoring-target storage apparatus 20000, thereby acquiring iSCSI initiator names which are permitted to access the storage apparatus 20000. Moreover, the management server 30000 acquires, from the iSNS server 35000, the IP address of an iSCSI initiator name which does not exist on a monitoring-target host out of the iSCSI initiator names, then adding the IP address into the monitoring-target nodes. Meanwhile, when an access from the management server 30000 to a monitoring-target node becomes impossible for a certain constant time-period due to a reason such that the monitoring-target node has been excluded from the network, the management server 30000 is capable of excluding the monitoring-target node from the monitoring targets on a GUI.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information system comprising:
an IP network;
host computers coupled to the IP network by first IP addresses;
a storage apparatus coupled to the IP network by a second IP address and providing a logical volume using an iSCSI target name;
an iSNS server coupled to the IP network; and
a management computer coupled to the IP network,
wherein the iSNS server stores iSCSI name information including associations between the first IP addresses and iSCSI initiator names and an association between the second IP address and an iSCSI target name, sends the iSCSI initiators names to the host computers, and sends the iSCSI target name to the storage apparatus,
wherein the storage apparatus stores access information including an accessible iSCSI initiator name for the iSCSI target name, and
wherein the management server is configured to:
(A) acquire the accessible iSCSI initiator name from the storage apparatus;
(B) acquire a corresponding IP address which is corresponding to the accessible iSCSI initiator name, from the iSNS server;
(C) store the corresponding IP address as a discovery target into discovery target information; and
(D) send a discovery request to a first part of the host computers via the IP network using the corresponding IP address.

2. An information system according to claim 1, wherein the management server is configured to:
(E) manage an IP address range for a discovery;
(F) select an IP address in the IP address range; and
(G) send the discovery request to a second part of the host computers via the IP network using the selected IP address.

3. An information system according to claim 2, wherein the first part of the host computers is different than the second part of the host computers.

4. An information system according to claim 3, wherein the host computers store the iSCSI initiator names sent by the iSNS server, and wherein the host computers send an iSCSI initiator name to the storage apparatus for access control.

5. An information system according to claim 4, wherein the first IP addresses are used to send the iSCSI initiator name.

6. A management computer, comprising:
a management port being configured to couple to an host computers, a storage apparatus, and an iSNS server;
a memory area; and
a processor,
wherein the host computers are coupled to the IP network by first IP addresses,
wherein the storage apparatus is coupled to the IP network by a second IP address and providing a logical volume using a iSCSI target name,
wherein the iSNS server is coupled to the IP network, and stores iSCSI name information including associations between the first IP addresses and iSCSI initiator names and an association between the second IP address and an iSCSI target name, sends the iSCSI initiators names to the host computers, and sends the iSCSI target name to the storage apparatus,
wherein the storage apparatus stores access information including an accessible iSCSI initiator name for the iSCSI target name, and
wherein the processor is configured to:
(A) acquire the accessible iSCSI initiator name from the storage apparatus;
(B) acquire a corresponding IP address which is corresponding to the accessible iSCSI initiator name, from the iSNS server;
(C) store the corresponding IP address as a discovery target into discovery target information; and
(D) send a discovery request to a first part of the host computers via the IP network using the corresponding IP address.

7. A management computer according to claim 6, wherein the processor is configured to:
(E) manage an IP address range for a discovery;
(F) select an IP address in the IP address range; and
(G) send the discovery request to a second part of the host computers via the IP network using the selected IP address.

8. A management computer according to claim 7, wherein the first part of the host computers is different than the second part of the host computers.

9. A management computer according to claim 8, wherein the host computers store the iSCSI initiator names sent by the iSNS server, and wherein the host computers send an iSCSI initiator name to the storage apparatus for access control.

10. A management computer according to claim 9, wherein the first IP addresses are used to send the iSCSI initiator name.

11. A non-transitory computer readable media storing a computer program for execution by a management computer configured to couple to host computers, a storage apparatus, and an iSNS server,
wherein the host computers are coupled to the IP network by first IP addresses,
wherein the storage apparatus is coupled to the IP network by a second IP address and providing a logical volume using a iSCSI target name,
wherein the iSNS server is coupled to the IP network, and stores iSCSI name information including associations between the first IP addresses and iSCSI initiator names and an association between the second IP address and a iSCSI target name, sends the iSCSI initiators names to the host computers, and sends the iSCSI target name to the storage apparatus,
wherein the storage apparatus stores access information including an accessible iSCSI initiator name for the iSCSI target name, and
the computer program comprising:
(A) a code causing the management computer to acquire the accessible iSCSI initiator name from the storage apparatus;
(B) a code causing the management computer to acquire a corresponding IP address which is corresponding to the accessible iSCSI initiator name, from the iSNS server;
(C) a code causing the management computer to store the corresponding IP address as a discovery target into discovery target information; and
(D) a code causing the management computer to send a discovery request to a first part of the host computers via the IP network using the corresponding IP address.

12. A computer readable media according to claim 11, wherein the computer program comprises:
(E) a code causing the management computer to manage an IP address range for a discovery;

(F) a code causing the management computer to select an IP address in the IP address range; and
(G) a code causing the management computer to send the discovery request to a second part of the host computers via the IP network using the selected IP address.

13. A computer readable media according to claim 12, wherein the first part of the host computers is different than the second part of the host computers.

14. A computer readable media according to claim 13, wherein the host computers store the iSCSI initiator names sent by the iSNS server, and wherein the host computers send an iSCSI initiator name to the storage apparatus for access control.

15. A computer readable media according to claim 14, wherein the first IP addresses is used to send the iSCSI initiator name.

* * * * *